(12) United States Patent
Williams et al.

(10) Patent No.: US 12,120,809 B1
(45) Date of Patent: Oct. 15, 2024

(54) HANDHELD PLASMA DEVICE PROCESS

(71) Applicant: Surfx Technologies LLC, Redondo Beach, CA (US)

(72) Inventors: Thomas Scott Williams, Long Beach, CA (US); George Suarez, West Sacramento, CA (US); Mikhail Grigoriev, Gardena, CA (US); Robert F. Hicks, Los Angeles, CA (US)

(73) Assignee: Surfx Technologies LLC, Redondo Beach, CA (US)

( * ) Notice: Subject to any disclaimer, the term of this patent is extended or adjusted under 35 U.S.C. 154(b) by 959 days.

(21) Appl. No.: 17/066,381

(22) Filed: Oct. 8, 2020

Related U.S. Application Data

(63) Continuation of application No. 15/586,223, filed on May 3, 2017, now Pat. No. 10,827,601.

(60) Provisional application No. 62/331,374, filed on May 3, 2016.

(51) Int. Cl.
*H05H 1/46* (2006.01)
*B23K 10/00* (2006.01)
*H05H 1/24* (2006.01)

(52) U.S. Cl.
CPC .............. *H05H 1/46* (2013.01); *B23K 10/00* (2013.01); *H05H 1/24* (2013.01); *H05H 1/4645* (2021.05)

(58) Field of Classification Search
CPC .......... H05H 1/46; H05H 1/4645; H05H 1/24; B23K 10/00
USPC ...................................................... 219/121.3
See application file for complete search history.

(56) References Cited

U.S. PATENT DOCUMENTS

| | | | | |
|---|---|---|---|---|
| 3,437,864 A | * | 4/1969 | Zieske | H05H 1/01 313/154 |
| 4,088,926 A | * | 5/1978 | Fletcher | H05H 1/38 315/111.21 |
| 4,219,705 A | * | 8/1980 | Hill | H01J 37/32055 381/165 |
| 4,434,742 A | * | 3/1984 | Henaff | B01J 19/08 136/258 |

(Continued)

FOREIGN PATENT DOCUMENTS

JP 07166357 A 6/1995

OTHER PUBLICATIONS

Inomata et al., Open air deposition of SiO2 film from a cold plasma torch of tetramethoxysilane-H2-Ar system, Appl. Phys. Lett., Jan. 3, 1994, pp. 46-47, 64(1).

(Continued)

*Primary Examiner* — Eric S Stapleton
(74) *Attorney, Agent, or Firm* — Canady & Lortz LLP; Bradley K. Lortz

(57) ABSTRACT

A method for using a handheld plasma tool for controlled application of low temperature atmospheric pressure plasma to material surfaces, e.g. to enhance bonding and or cleaning is disclosed. The handheld plasma tool can include a hand grip, on/off trigger, display, indicator lights, indexing pin, marking device, cable connections for gas supply and electrical power, and a plasma head for generating at least one reactive gas species at a low temperature. The handheld plasma tool can employ a rotatable clamp for treating backside surfaces. The handheld plasma tool can include motorized wheels to scan over a large area at a controlled speed. Other optional nozzles can also be employed for specialized applications.

19 Claims, 19 Drawing Sheets

(56) References Cited

U.S. PATENT DOCUMENTS

| | | | | |
|---|---|---|---|---|
| 5,147,493 A * | 9/1992 | Nishimura | ........ | H01J 37/32082 204/298.34 |
| 5,198,724 A * | 3/1993 | Koinuma | ................ | H05H 1/46 156/345.43 |
| 5,225,740 A * | 7/1993 | Ohkawa | ................... | H05H 1/46 315/111.41 |
| 5,285,046 A * | 2/1994 | Hansz | ..................... | C23C 4/134 219/121.48 |
| 5,309,063 A * | 5/1994 | Singh | .................... | H01J 37/321 315/111.41 |
| 5,414,324 A * | 5/1995 | Roth | ....................... | H05B 7/16 315/111.21 |
| 5,789,867 A * | 8/1998 | Westendorp | ...... | H01J 37/32009 315/111.21 |
| 5,961,772 A * | 10/1999 | Selwyn | ............ | H01J 37/32366 156/345.43 |
| 5,977,715 A * | 11/1999 | Li | ........................... | H05H 1/54 219/121.36 |
| 5,997,956 A * | 12/1999 | Hunt | .................. | C23C 16/4486 427/446 |
| 6,204,605 B1 * | 3/2001 | Laroussi | ................. | H05H 1/24 219/121.52 |
| 6,262,523 B1 * | 7/2001 | Selwyn | ............. | H01J 37/32082 313/231.71 |
| 6,465,964 B1 * | 10/2002 | Taguchi | ................. | H01J 37/32 315/111.21 |
| 6,659,110 B2 * | 12/2003 | Fornsel | ................... | B41F 35/00 219/121.48 |
| 6,730,238 B2 * | 5/2004 | Li | ...................... | C03C 25/6293 422/23 |
| 7,329,608 B2 * | 2/2008 | Babayan | ............ | H10K 50/8426 427/535 |
| 8,328,982 B1 * | 12/2012 | Babayan | .............. | H05H 1/2406 156/345.43 |
| 9,656,095 B2 * | 5/2017 | Watson | ..................... | A61N 1/44 |
| 10,827,601 B1 * | 11/2020 | Williams | ................ | H05H 1/46 |
| 2001/0006093 A1 * | 7/2001 | Tabuchi | .................. | C23C 16/50 156/345.43 |
| 2002/0008480 A1 * | 1/2002 | Yamazaki | ......... | H01J 37/32357 315/111.21 |
| 2002/0129902 A1 * | 9/2002 | Babayan | ........... | H01J 37/32009 156/345.43 |
| 2006/0156983 A1 * | 7/2006 | Penelon | ................ | C23C 16/402 156/345.47 |
| 2013/0068732 A1 * | 3/2013 | Watson | ..................... | A61L 2/14 219/121.59 |
| 2013/0069530 A1 * | 3/2013 | Watson | ..................... | A61L 2/00 315/111.21 |
| 2013/0072859 A1 * | 3/2013 | Watson | ............... | H01J 37/3244 604/23 |
| 2015/0292624 A1 * | 10/2015 | Pretty | ..................... | B60J 10/30 277/645 |
| 2016/0106993 A1 * | 4/2016 | Watson | ................. | A61M 16/12 604/23 |
| 2016/0354614 A1 * | 12/2016 | Watson | ............. | H01J 37/32348 |

OTHER PUBLICATIONS

Koinuma et al., Development and application of a microbeam plasma. generator, Appl. Phys. Lett., Feb. 17, 1992, pp. 816-817, 60(7).

* cited by examiner

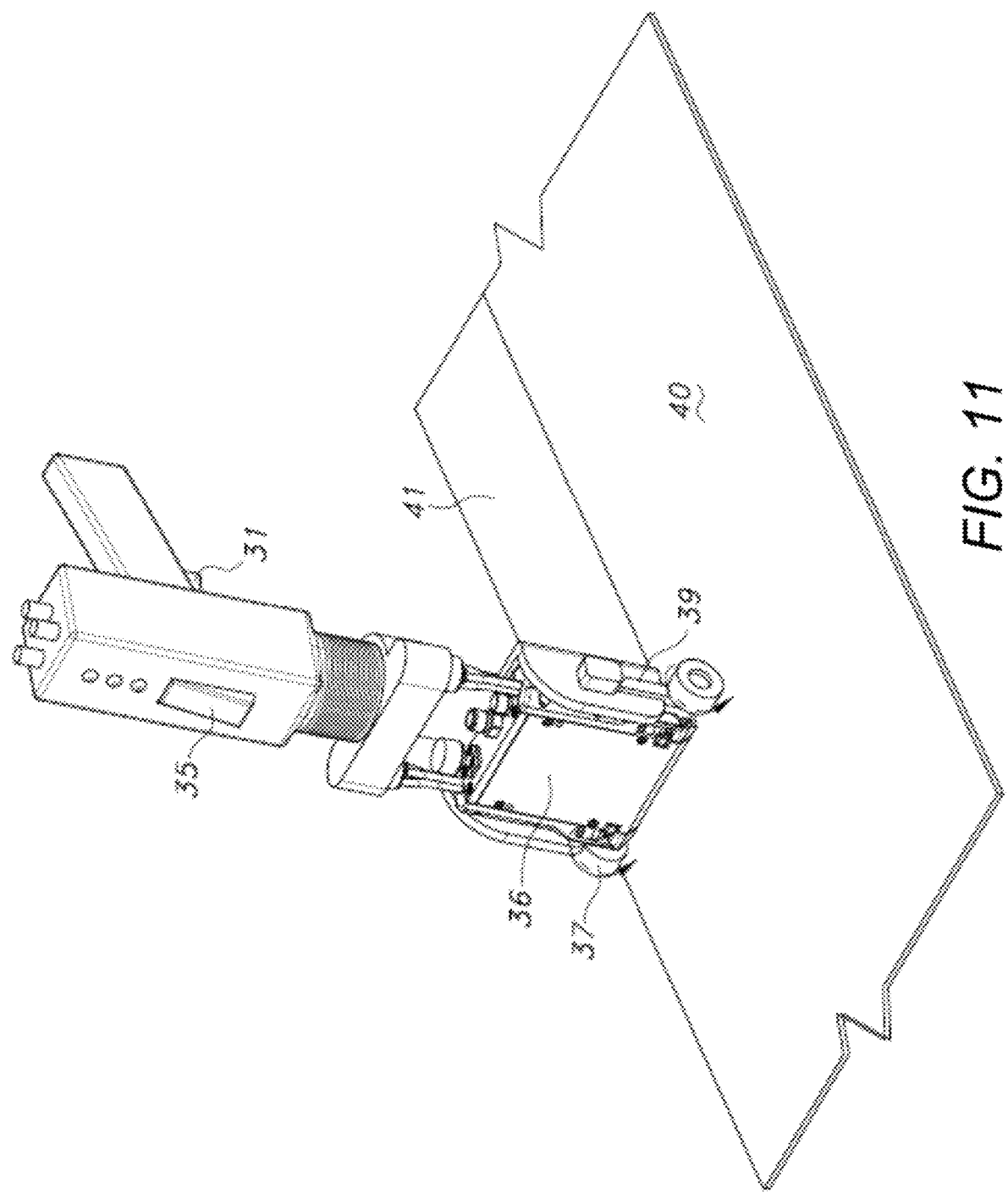

HANDHELD PLASMA DEVICE PROCESS

CROSS-REFERENCE TO RELATED APPLICATIONS

This continuation application claims the benefit under 35 U.S.C. § 120 of the following co-pending and commonly assigned U.S. utility patent application:

U.S. patent application Ser. No. 15/586,223, filed May 3, 2017 and entitled "HANDHELD PLASMA DEVICE," by Williams et al. which application claims the benefit of U.S. Provisional Patent Application No. 62/331,374, filed May 3, 2016, and entitled "HANDHELD PLASMA DEVICE," by Williams et al..

STATEMENT OF GOVERNMENT RIGHTS

This invention was made with Government support under contract No. FA8650-13-C-5020 awarded by the United States Air Force. The Government has certain rights in this invention.

BACKGROUND OF THE INVENTION

1. Field of the Invention

The invention is related to a handheld atmospheric pressure plasma device for treating surfaces. An operator holds the device by hand and sweeps it over the surface, whereby the reactive gas generated by the plasma treats the surface in one or more ways that improve the material properties. The plasma treatment can clean, activate, etch, or deposit a coating on the material surface. The cleaning and activation process is well suited for improving the adhesion to the surface of glue, ink, paint, coatings, and thin films. The handheld plasma is well suited for the manufacturing and repair of products fabricated from plastics, polymer composites, metals, glass, and ceramics. An operator is able to translate the atmospheric pressure plasma device over the component parts, thereby cleaning and activating the surfaces. Next, the operator may join the parts together, or print, paint, or coat on them. Plasma surface preparation facilitates strong adhesion of the glue, ink, paint, or coating to the part surface.

2. Description of the Related Art

When products are manufactured, many of the components are joined together using adhesives. The bond made with the adhesive must not fail throughout the useful life of the product. A list of products where adhesive bonding is a critical part of the manufacturing process includes, but is not limited to, automobiles, aircraft, boats, helicopters, trains, rockets, satellites, medical devices, sports equipment, storage tanks, pipelines, telecommunications equipment, computers, smart phones, televisions and appliances.

Adhesive bonding plays a key role in aircraft manufacturing. Carbon-fiber-reinforced composites are being used more and more frequently in the aerospace industry, due to their superior strength-to-weight ratio compared to metals. In large commercial aircraft, composites are frequently employed in secondary structures. However, their use has been limited in primary structures, including the wings and fuselage, due to the difficulty in joining the composites together reliably and with the durability necessary to ensure safe operation of the aircraft throughout its service life.

For example, aircraft wing skins must be attached to structural spars and ribs. Previously, this has been accomplished with metal fasteners. However, the fasteners add undesired weight to the aircraft, drive up the manufacturing cost, and are subject to corrosion. Riveted and bolted joints in aircraft are a critical element for the integrity of an airframe, and significant effort must be expended on creating these joints because they are subject to high stresses.

It is often the case that the diameter of fasteners varies, with diameters in excess of 25 mm at the root and as small as 3 or 4 mm at the tip. This degree of specialization raises the cost because it reduces economies of scale in purchasing and inventory control, but it offers the advantage of considerable weight savings. To complete the assembly of wings and fuselage structures, a mechanic must insert each fastener individually. In addition, he must prepare the metal or composite surface around the opening by solvent wiping, abrading and deburring the opening when necessary. Tens or even hundreds of thousands of fasteners are installed this way on every aircraft. This work is one of the main costs of manufacturing the plane. A good deal of effort has been expended trying to reduce this cost and speed up this phase of aircraft manufacturing.

Thus, there is a need for all-bonded aircraft structures which eliminate the use of mechanical fasteners entirely, and can be assembled into large structures by bonding rather than riveting. Adhesive bonding is a low-cost alternative for the assembly of ribs and spars to skins for both fuselage and wing construction, and also of metallic honeycombs to skins for elevators, ailerons, tabs, and spoilers. Nevertheless, the adhesive joint must be just as strong and just as reliable as the riveted joint that it replaces.

Another method used for to fabricate metal or composite structures is fastening together components with bonded nutplates. Adhesively bonded nutplates can be installed in a fraction of the time required for the installation of riveted nutplates, thereby significantly reducing the cost. While these savings are a significant advantage, preparation of the material surface before nutplate bonding is a crucial step in obtaining a strong, durable joint. Currently, surface preparation is performed by hand using an abrasive, such as a Scotch-Brite™ pad. This manual process can lead to improperly prepared surfaces, with weak joints that fail during use and result in time consuming and expensive repairs. Therefore, there is a need for a surface preparation process that can be applied efficiently and reliably, and produces a strong, durable bond between the nutplate and the aircraft component.

Marking, printing, painting and coating materials is an essential part of manufacturing commercial products, including, but not limited to, automobiles, aircraft, boats, and sports equipment. The ink, paint or coating must permanently adhere to the part surface and not flake off during use. In order for the ink, paint, or coating to permanently bond to the part, its surface must be clean and free of contaminants, and must be activated so that strong chemical bonds are achieved. Today, surfaces are cleaned manually by washing, solvent wiping and abrasion. These processes are not reliable, and ultimately yield products where the ink, paint or coating wears off during use. Therefore, prior to marking, printing, painting and coating, there is a need for a surface preparation process that can be applied efficiently and reliably, and produces strong, permanent adhesion of the ink, paint or coating to the material surface.

In aircraft manufacturing, metal parts made from aluminum, stainless steel, titanium and related alloys are pretreated by immersion in acid baths. These procedures involve complex, multistage processes that combine degreasing, abrading, etching, and anodizing. The wet chemical solutions employ strong acids and copious rinsing with distilled water. Disposal of the hazardous waste from these operations is a big concern. These procedures are also employed at maintenance depots whenever the aircraft are repaired.

The process of preparing aluminum aircraft components requires wet chemical processing to clean, etch, and de-oxidize the metal surface prior to the application of chemical conversion coatings or anodization. These processes include multiple dip cycles, large amounts of water for rinsing, and expose workers to hazardous, cancer-causing chemicals. Safely storing, handling, transporting and disposing of these chemicals is a challenge that entails significant costs. Alternative technologies are needed to replace these chemical immersion baths.

An alternative way to prepare a surface for bonding, is to treat it with the reactive gas from a low-temperature plasma. This dry plasma process can be used for cleaning and preparing structures as a replacement for abrasion or hazardous chemical treatment. Plasmas are ionized gases that are generated by applying an electrical signal to a powered and grounded electrode with sufficient energy to break down the gas between the electrodes and cause a current to flow between them (see for example, Lieberman and Lichtenberg, "*Principles of Plasma Discharges and Materials Processing*," John Wiley & Sons, Inc., New York, 1994; Chen, "*Introduction to Plasma Physics and Controlled Fusion*," Plenum Press, New York, 1984; and Roth, "*Industrial Plasma Engineering: Vol. I, Principles*" Institute of Physics Publishing, Philadelphia, P A, 1995). Energetic electrons in the plasma break apart molecules, including, but not limited to, $O_2$, producing O atoms. These O atoms react with organic contaminants on surfaces, and oxidize away the organics as $CO_2$ and $H_2O$. In addition, the O atoms will oxidize the material surface, and create functional groups that will covalently bond to glue, ink, paint, and coatings. Another beneficial aspect of plasma processes is that they produce no hazardous waste.

Low-temperature plasmas are employed in materials manufacturing for a diverse range of processes, including surface activation, etching, cleaning, sterilization, decontamination, and thin film deposition. Plasma activation offers the ability to modify surfaces without affecting the bulk properties. This makes plasma an effective tool for the surface preparation of materials prior to bonding. Plasma activation is performed using technologies that fall into one of two categories: vacuum-based systems, or those which operate in open air (see for example, Lieberman and Lichtenberg, "*Principles of Plasma Discharges and Materials Processing*," John Wiley & Sons, Inc., New York, 1994; Chen, "*Introduction to Plasma Physics and Controlled Fusion*," Plenum Press, New York, 1984; and Roth, "*Industrial Plasma Engineering: Vol. I, Principles*" Institute of Physics Publishing, Philadelphia, PA, 1995).

Vacuum-based plasma systems have a number of drawbacks, including the need to limit the size and shape of the components so they fit inside the chamber, as well as the cost associated with maintaining and operating the vacuum system. Low-pressure devices are operated in a batch mode, and find wide application in semiconductor fabrication. By contrast, atmospheric pressure plasmas may be operated in continuous mode on an assembly line. This approach is more common in the automotive, aerospace, and specialty materials industries.

Low-temperature, atmospheric pressure plasmas are weakly ionized discharges, such that only a small fraction of the gas molecules become ionized (see Schütze, et al., "*The Atmospheric-Pressure Plasma Jet: A Review and Comparison to other Plasma Sources*," IEEE Transactions in Plasma Science, vol. 26, page 1685 (1998)). These systems are not at equilibrium, because the temperature of the free electrons is several orders of magnitude higher than the temperature of the neutral species. The reactive neutral species produced in the atmospheric pressure plasma (for example, oxygen atoms) flow out of the device and over the material surface to be treated. Since the reactive gas temperature is low, no thermal damage occurs to the material, which can be made of plastic, polymer composites, metal, glass, or ceramics. Several types of non-equilibrium, atmospheric pressure plasmas have been developed. These include coronas, dielectric barrier discharges, micro hollow cathode discharges, arc-type plasma torches, and radio frequency powered, capacitive discharges.

A corona is an electrical discharge where ionization takes place in a region of high electric field. The most common type of corona is the point-to-plane construct, where one of the electrodes is a narrow wire or a metal tip and the other electrode is planar (see Goldman and Goldman, "*Corona Discharges*" Gaseous Electronics, vol. 1, (Eds: Hirsh and Oakam), Academic Press, New York, 1978). Power, at frequencies ranging from 50 Hz to 20 kHz, is supplied to the pointed electrode, creating a high electric field that promotes breakdown of the gas in the vicinity of the electrode. A localized, luminous discharge is created around the tip of the powered electrode. Since the plasma density falls rapidly away from the sharp tip, one must pass the substrate very close to the electrode for the substrate to be processed at a suitable rate. Therefore, this device is for the most part restricted to treating plastic film or fabric that is continuously passed through the plasma in a roll-to-roll format.

Dielectric barrier discharges, also known as "silent" discharges, operate with two metal electrodes, in which at least one is coated with a dielectric material. The metal electrodes are separated by a uniform gap, and are powered by DC or AC at frequencies up to 20 kHz. In most cases, dielectric barrier discharges operate in a "filamentary" or "microdischarge" mode, where the plasma exhibits short-lived micro arcs that are randomly distributed in space and time (see Eliasson and Kogelschatz, IEEE Transactions in Plasma Science, vol. 19, page 1063, 1991). A uniform, diffuse glow mode can be obtained in a dielectric barrier discharge when an inert gas, for example, helium and argon, is used as a diluent. The electron density in these plasmas varies over a wide range depending on whether the gas is sampled inside or outside a streamer. Nevertheless, the average electron density is low, $\sim 10^9$ $cm^3$, which means that like a corona one may have to insert the substrate into the plasma between the electrodes to obtain a suitable surface treatment rate.

Microhollow cathode discharges are direct-current glow discharges sustained between two parallel metal electrodes with a center opening of 0.1 mm in diameter in either the cathode, or the cathode and the anode (see Stark and Schoenbach, Applied Physics Letters, vol. 74, page 3770, 1999; and Bardos and Barankova, Surface Coating Technologies, vol. 133-134, page 522, 2000). The electrodes are separated by a gap of 0.2 to 0.4 mm, which is often filled with a dielectric material. Gas, including argon or air is passed through the hole where it is ionized by application of electrical power. The plasma density is highest inside the hole at $10^{14}$ $cm^{-3}$, and quickly decreases in density outside of this region. Hollow cathode discharges are mostly used as light sources and processing materials with these devices has been limited.

Plasma torches operate by forming an arc between two metal electrodes. Gas flows through this arc-type discharge, which leads to the generation of reactive gaseous species. The torch is a thermal plasma in which the temperature of the bulk gas approaches that of the electron temperature within the discharge. The high collision rate of electrons with neutrals causes rapid heating of the gas to temperatures between 5,000 and 14,000° ° C. These temperatures are not suitable for treating polymers and composite materials, since a high gas temperature will damage or melt the substrate. It is possible to blow a sufficient amount of gas through the arc so that the overall gas temperature is reduced to ~300° C. Even at these lower temperatures, thermal damage to the material being treated can occur. Additionally, the electrodes are sputtered during operation due to the high impact rate of positively charged ions with the surface of the metal electrodes. The byproducts of sputtering have the potential to contaminate the material being treated.

A non-equilibrium, atmospheric pressure discharge may be produced by flowing gas between two closely spaced metal electrodes that are driven with high-frequency power (see Koinuma et al., U.S. Pat. No. 5,198,724; Li et al., U.S. Pat. Nos. 5,977,715 and 6,730,238; and Selwyn, U.S. Pat. No. 5,961,772). These plasmas have been used to process materials placed a short distance downstream of the electrodes. The disadvantage of these constructs is that the plasma beam is produced as a small spot. In addition, the concentration of reactive species generated in these plasmas can be relatively low.

Babayan and Hicks (U.S. Pat. No. 7,329,608) describe an apparatus that comprises a housing with two perforated metal electrodes. Gas flows through the electrodes and is partially ionized by applying radio frequency power at 13.56 MHz to one of the electrodes. Neutral reactive gas species are produced in the plasma and flow out of the device and may be used to treat substrates placed a short distance downstream. It was observed that the etch rate of photoresist with an oxygen and helium plasma at 760 Torr was between 0.4 and 1.5 microns per minute over a circular area 30 mm in diameter. Note that for this type of plasma device, the outlet must be placed close to the substrate, i.e. ≤1 cm away. This means that one must control the source-to-sample distance, especially when treating 3-dimensional objects.

Babayan and Hicks (U.S. Pat. No. 8,328,982) describe another atmospheric pressure, radio-frequency plasma that produces a linear beam of reactive gas that can vary from less than 1.0 cm to more than 300.0 cm in width. Such a device can treat wide swaths of material, including polymers, composites, metals, and glass. This plasma device uses an inert carrier gas, helium or argon, operates at low voltages (100 to 300 V), low power (20 to 200 W per 2.5 cm of beam width), and low temperature (<120° C.). It has been shown that even though the power and temperature are low in this atmospheric pressure plasma, it treats the surface of materials at a relatively fast rate (see R. F. Hicks and S. Babayan, U.S. Pat. No. 8,632,651, Jan. 21, 2014; R. J. Zaldivar et al., Journal of Applied Polymer Science, vol. 120, page 921, 2010; R. J. Zaldivar et al., Journal of Composite Materials, vol. 44, page 137, 2010; R. J. Zaldivar et al, Journal of Composite Materials, vol. 44, page 137, 2010; A. Schutze et al., IEEE Transactions on Plasma Science, vol. 26, page 1685, 1998; M. Moravej et al., Plasma Sources Science and Technology, vol. 13, page 8, 2004; E. Gonzalez et al., Plasma Processes and Polymers, vol. 7, page 482, 2010; E. Gonzalez et al., Langmuir, vol. 24, page 12636, 2008; E. Gonzalez et al, IEEE. Transactions on Plasma Science, vol. 37, page 823, 2009; E. Gonzalez and R. F. Hicks, Langmuir, vol. 26, page 3710, 2010; T. S. Williams et al., Journal of Composite Materials, vol. 48, page 219, 2014; T. S. Williams et al, Journal of Adhesion Science and Technology, vol. 28, page 653, 2014; E. W. Harris et al., Proceedings of SAMPE Spring Technical Meeting, 2011; H. Yu et al., Carbon, vol. 57, page 11, 2013). These publications have shown that the RF plasma is effective for cleaning and adhesion promotion on a many materials, including, but not limited to, silicon dioxide, ceramics, metals, carbon nanotubes, carbon-fiber-reinforced composites and polymers. Polymers that may be cleaned and activated with the atmospheric plasma include, but are not limited to, polyethylene (PE), polypropylene (PP), polystyrene (PS), nylon, polyethyleneterephthalate (PET), polymethylmethacrylate (PMMA), polyetheretherketone (PEEK), polyethylenenaphthalate (PEN), polyethersulfone (PES), and polysulfone (PSU).

Atmospheric pressure plasma processes are employed in roll-to-roll setups for treating plastic film or fabrics. Alternatively, the plasma device can be mounted on a robotic arm and scanned over the surface of a 3-D part. These configurations are highly reproducible, since the plasma scan speed and source-to-sample distance are tightly controlled. Nevertheless, these methods are expensive, requiring sophisticated automation in addition to the atmospheric plasma system itself. There are many other manufacturing operations that do not lend themselves to automation, or cannot afford this level of sophistication. One example is fabricating large aircraft, where the production volume is one plane per day or per week. Under these circumstances, it is easier and more cost effective to use human operators to manipulate the plasma tool over the aircraft surface. In order for human operators to use atmospheric pressure plasmas without risk, these devices must be low voltage, low temperature, and light enough to be held in the hand.

Handheld carriages for mounting atmospheric pressure plasmas (Babayan and Hicks, U.S. Pat. No. 8,328,982) have been described. However, no hand plasma tools have been described that provide the operator with control over the surface treatment parameters, and can treat both flat and 3-dimensional substrates of any size or shape. In particular, there is a need for a handheld plasma tool that controls scan speed, exposure time, and source-to-sample distance. In addition, there is a need for a handheld plasma device that provides the operator with an indication of which areas on the substrate have been treated. Moreover, there is a need for a handheld plasma tool that has different beam sizes and widths so that it can treat large areas as well as tight spaces, both of which are common in many assembled products. As described hereafter, these and other needs are met by the embodiments of the invention.

SUMMARY OF THE INVENTION

The invention is embodied in a handheld plasma tool and its method of use. In one embodiment the handheld plasma tool includes a hand grip, on/off trigger, display, indicator lights, indexing pin, marking device, cable connections for gas supply and electrical power, and a plasma head for generating at least one reactive gas species at a low temperature. The at least one reactive gas species is suitable for treating material surfaces, including, but not limited to, cleaning and activating a surface for adhesion of glue, ink, coatings and paint, sterilizing a surface, etching material from a surface, and coating a surface. In one embodiment, the handheld plasma tool is used to clean and activate a surface prior to bonding fasteners and nutplates. In another embodiment, the handheld plasma tool is used to scan over a large area at a controlled speed in order to accurately and reliably clean, activate, sterilize, etch, or deposit a coating on the material surface. The invention is further embodied in a handheld plasma tool for treating the surface of materials that include, but are not limited to, fiber-reinforced composites, plastics, ceramics, glass and metals. The plasma process is safe for personnel to use, is environmentally friendly, and produces no hazardous waste.

To overcome the limitations in the prior art, and to overcome other limitations that will become apparent upon reading and understanding the specification, the invention is directed to a handheld plasma tool and its use for surface treatment. Particularly, the invention is related to a device for generating a low temperature, atmospheric pressure plasma that can be manually operated, and used for precise surface treatment of materials, including cleaning, activating, sterilizing, etching and depositing thin coatings. In one embodiment, the low temperature, atmospheric pressure plasma is enclosed within a hand tool for manual treatment of materials, including, but not limited to, ceramics, glass, polymers, metals and composites. The handheld plasma tool may treat surfaces in a stationary mode at a fixed distance for a controlled period of time, or may treat surfaces by scanning over them at a controlled speed and fixed distance. In one embodiment, the handheld plasma tool is configured to treat parts that are large and/or three dimensional, and are not conveniently or economically processed in a chamber, or with a robotically actuated plasma applicator.

In one embodiment, the handheld plasma tool is used to prepare substrates for nutplate installation. The plasma tool is contained within a housing with an ergonomic handle extending from the bottom. A showerhead type plasma applicator is embedded in one end of a clamp, while a hole-indexing pin is at the other end. A high density of reactive species is generated within the plasma device. These species flow out of a showerhead and onto a substrate that is fixed a short distance away. The distance from the plasma tool to the treatment area is controlled by spacers on the plasma applicator to ensure that the operator gives the proper intensity of treatment. The handheld plasma tool may include a timer for stopping treatment after the allotted exposure time.

The invention is further embodied in alterations to the handheld plasma tool to treat nutplate holes of differing sizes and under multiple orientations. The tool can be outfitted with a number of features, including a variable indexing tip to securely align with different sizes of holes, a marking tip to clearly identify holes that have been prepared, and a positioning ring to rotate the plasma clamp to multiple orientations. This enables the operator to access holes placed on the top, bottom, or sides of a part without adding stress to their wrist, elbow or arm. This feature permits for ergonomic use of the handheld plasma tool.

The invention is further embodied in an interface on the handheld plasma tool that allows communication with the main controller to specify the treatment conditions. The operator uses this feature to turn the plasma on and off, purge the gas lines, select the treatment recipe, and view the status of the unit. In another embodiment of the invention, an alarm is mounted on the handheld plasma tool to provide an audible signal when the device is not working properly.

Other embodiments of the invention include, but are not limited to, the incorporation of light-emitting diodes for indicating treatment status.

In another embodiment, the invention is a handheld plasma tool constructed to treat the surfaces of objects of any size and shape with the low temperature, atmospheric pressure plasma. In this embodiment, the handheld plasma tool scans over the substrate surface at a controlled speed and source-to-sample distance. This embodiment may be used to treat large areas prior to bonding component parts together, for example, bonding the skin and spars together of an aircraft wing. In one embodiment, the handheld plasma tool is equipped with motorized wheels that drive the device over the part surface at the desired treatment speed. A mechanism is contained within the handheld plasma tool to ensure that it maintains the desired distance from the plasma outlet to the material surface. In this embodiment of the invention, the handheld plasma tool may contain an alarm with a light or audible signal to warn the operator when the tool is not performing to specifications.

Another embodiment of the invention is the use of marking techniques to indicate when a material has been treated with the handheld plasma tool. Areas that have received plasma treatment can be indicated through the use of multiple types of marking systems, including but not limited to, laser scribing, ink marking, or computer positional tracking, among others, and would be obvious to those skilled in the art.

A variety of electrode configurations may be employed. A showerhead plasma applicator can be used where the device employs perforated electrodes. In one embodiment of the invention, a showerhead plasma construct is made much more compact with the incoming gas flow distributed evenly across the electrodes without the need for a large volume.

In another embodiment of the invention, interchangeable plasma heads are installed on the handheld plasma tool to treat different three-dimensional objects. In one embodiment, the plasma head is a small tip that may be inserted inside a hole to treat the bottom and sidewalls of the hole, thereby activating all the surfaces for adhesion. Different interchangeable plasma heads allow the operator to treat material surfaces that are difficult to access with only one large-area plasma source.

In a further embodiment of the invention, the handheld plasma tool may include a device for injecting a chemical precursor into the reactive gas flow so that a coating is deposited onto the substrate. The chemical precursor decomposes through reaction with the reactive species generated by the plasma, and liberates atomic species that adsorb onto the material surface and form a desired coating. The coating is deposited over a large area by translating the handheld plasma tool back and forth over the work piece.

At least a portion of the gas flowing through the handheld plasma tool is selected from the group comprising helium, argon, oxygen, nitrogen, hydrogen, ammonia, carbon monoxide, carbon dioxide, carbon tetrafluoride, sulfur hexafluoride, methane, acetylene, and mixtures thereof. The reactive species flowing out of the handheld plasma tool are used to perform a surface treatment, including, but not limited to, cleaning, activation for adhesion, etching, sterilization, chemical functionalization, and thin film deposition.

In one exemplary embodiment, an apparatus for treating a material surface with an atmospheric pressure plasma, includes a handheld device for manipulating and controlling application of a reactive gas of the plasma to the material surface, an applicator coupled to the device having a gas passage from the handheld device to an outlet such that the reactive gas of the plasma can flow out the outlet and contact the material surface, and a ventilated spacer affixed to the applicator for contacting the material surface to maintain a defined separation between the outlet of the applicator and the material surface. Typically, the applicator can develop the plasma having the reactive gas from a gas flow directed from the handheld device through the gas passage and into a gap between a powered electrode and a grounded electrode when the powered electrode is coupled to radio frequency electrical power.

In some embodiments, the applicator can comprise an indexing tip for inserting into a hole in the material surface such that the plasma is applied to the material surface proximate to the hole. A marking ring can be disposed around the indexing tip for marking the material surface proximate the hole to indicate plasma has been applied. The marking ring can be actuated to mark the material surface after application of the plasma. The applicator can comprise a clamp configuration including the gas passage for directing the plasma to a backside of the material surface and the indexing tip is for engaging the hole from a front side of the material surface. The gas passage of the applicator comprising the clamp can make two bends in series. The clamp can be rotatable about the outlet while the applicator remains coupled to the handheld device. Typically, the clamp is retracted towards the handheld device to contact the backside of the material surface and maintain pressure against the backside of the material surface prior to application of the plasma. The outlet can comprise a showerhead of the clamp include a second indexing tip extending therefrom for engaging a backside of the selected one of the one or more holes in the material surface.

In some embodiments, the ventilated spacer comprises a crenulated lip disposed around a showerhead of the applicator. The crenulated lip against the material surface can create the defined separation between the showerhead and an area surrounding the hole of the material surface for application of the plasma. Gaps around the crenulated lip can allow ventilation of the gas of utilized plasma. Alternately, the outlet can comprise a slit for directing the reactive gas onto a strip of the material surface and the ventilated spacer comprises wheels affixed to the applicator to translate the apparatus along the material surface whilst maintaining the defined distance between the outlet and the material surface. The wheels can be motorized at a controlled speed to regulate scanning speed of the applicator over the material surface. In addition, the pair of wheels can include a marking device for marking the material surface proximate the area to indicate plasma has been applied. A nozzle for directing the plasma from the slit out a plurality of holes at opposing angles from a narrowed tip can be employed.

Another embodiment of the invention comprises an apparatus for treating a hole in a material with an atmospheric pressure plasma, including a handheld device for manipulating and controlling application of a reactive gas of the plasma to the hole where the plasma is developed from a gas flow in a gap between a powered electrode and a grounded electrode when the powered electrode is coupled to radio frequency electrical power, and a hollow tip coupled to the plasma with at least one opening in it such that the reactive gas from the plasma can flow out and contact the surface area of the hole. The apparatus can include a marking ring disposed around the hollow tip for marking the material surface proximate the hole to indicate plasma has been applied. The applicator can also include a crenulated lip disposed around the hollow tip as a ventilated spacer. This embodiment can be further modified consistent with any other apparatus or method described herein.

Various advantages and features of novelty which characterize the invention are pointed out with particularity to the claims annexed hereto and form a part hereof. For a further understanding of the invention, its advantages, and the objects obtained by its use, reference should be made to the drawings which form a further part hereof, and to the accompanying descriptive matter, in which there is illustrated and described specific examples in accordance with the invention.

BRIEF DESCRIPTION OF THE DRAWINGS

FIG. 1 is an illustration of a handheld plasma tool for cleaning and activating a material surface prior to bonding a fastener or a nutplate to it. The tool contains an articulating head that positions the plasma showerhead on the backside of a composite or metal panel that a fastener or nutplate will be bonded to.

FIG. 7 is an illustration of a handheld plasma tool for cleaning and activating the front side of a material surface prior to bonding a fastener or a nutplate to it. The tool contains an indexing pin at the center of the showerhead that positions the plasma around the hole that a fastener or nutplate will be bonded to.

FIG. 11 is an illustration of the handheld plasma tool treating a large strip of a composite surface prior to applying an adhesive film for bonding to another structure.

DETAILED DESCRIPTION OF THE PREFERRED EMBODIMENT

Figure 1:
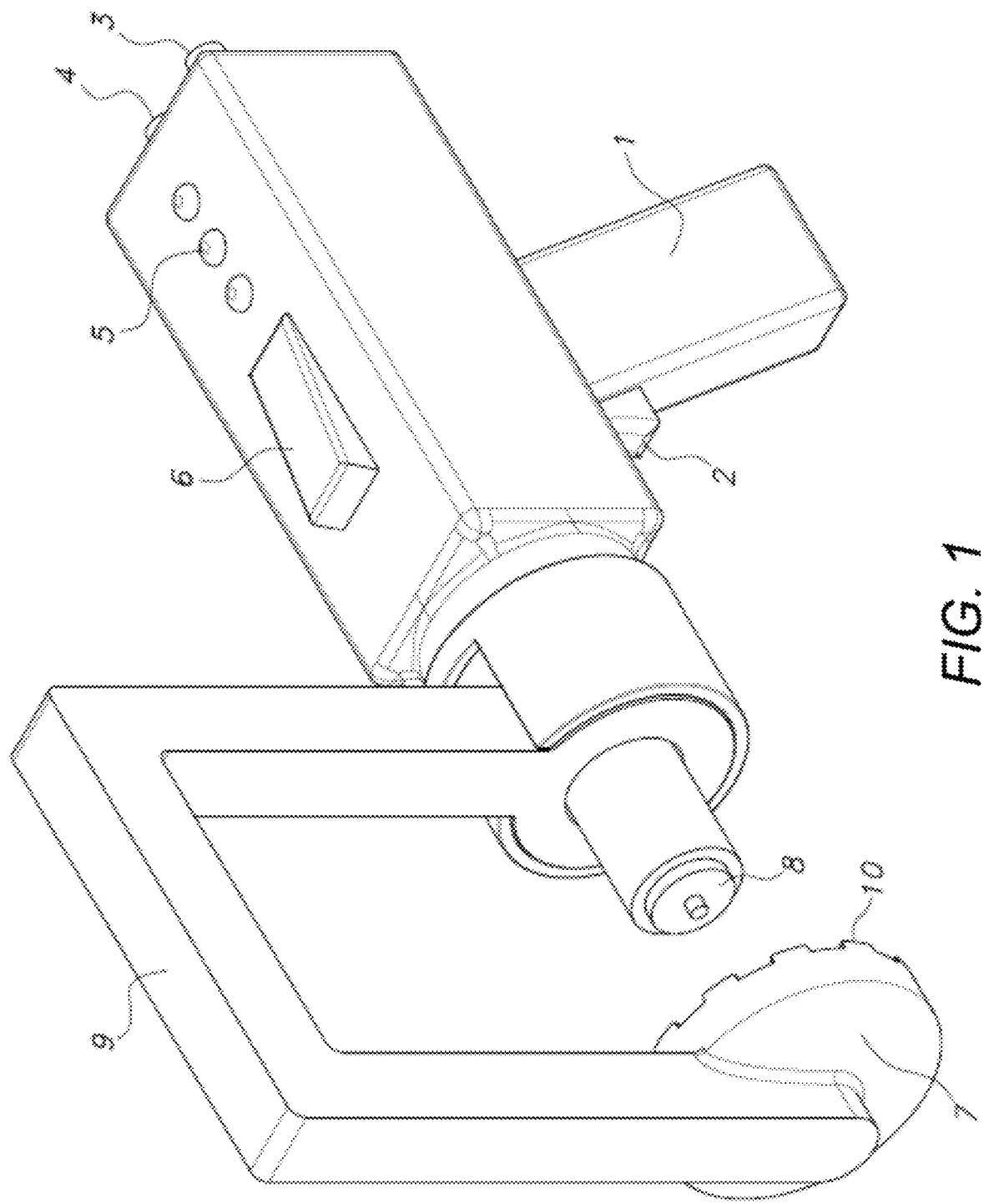

In the following description of the preferred embodiments, reference is made to the accompanying drawings, which form a part hereof, and in which is shown by way of illustration the specific embodiment in which the invention may be practiced. It is to be understood that other embodiments may be utilized, and structural and functional changes may be made, without departing from the scope of the invention.

1. Overview

Various embodiments of the invention are directed to a handheld plasma tool and its use for the surface treatment of materials. Embodiments of the invention can be employed to clean a surface through removal of organic contamination. The invention may be employed to activate and functionalize a surface, thereby enhancing adhesion between the material and an adhesive, ink, paint, or coating. Embodiments of the invention can be employed to kill microorganisms on a surface, thereby sterilizing the material. Embodiments of the invention can be employed to etch away the surface of a material, or to deposit thin films and coatings onto a material.

One embodiment of the invention includes a plasma applicator incorporated into a lightweight, ergonomic housing with a grip and trigger for turning on and off the plasma. This aspect of the invention makes it easy for the operator to manipulate the tool while treating the surface of a material. Utilities are provided to the handheld plasma tool via one or more cables. The cable supplies electrical power, gases, and communication links with a remote controller. The remote controller regulates the delivery of the said utilities. Gas containing at least one reactive species is produced in the plasma and flows from the outlet and onto a material where it treats the surface by cleaning, activation, functionalization, sterilization, etching, and/or deposition.

Apparatuses and techniques for development of the atmospheric-pressure plasma within the handheld device are known. For example, the embodiments described hereafter in FIGS. 1-8 (employing showerhead plasma sources) incorporate plasma generation as described in U.S. Pat. No. 7,329,608, which is incorporated by reference herein, and the embodiments described hereafter in FIGS. 10-18 (employing linear beam plasma sources) incorporate plasma generation as described in U.S. Pat. No. 8,328,982, which is incorporated by reference herein. These patents describe internal structure of example suitable plasma devices as will be understood by those skilled in the art.

One aspect of embodiments of the invention incorporates a ventilated spacer. A handheld device for manipulation and direction of a plasma to be applied to a surface, e.g. to prepare the surface for bonding is coupled to an applicator. Typically, the applicator includes the powered and ground electrodes where the plasma is generated just before an outlet. A ventilated spacer is affixed to the applicator near the outlet. In use, the ventilated spacer contacts the material surface and establishes a defined separation between the outlet and the material surface. The particular separation distance is determined based on the application in order to optimize the effectiveness of the plasma treatment. In addition to establishing the separation distance, the ventilated spacer also provides ventilation of the plasma after it contacts the material surface. It is important to create a plasma flow to have new reactive gas from plasma continuously contact the surface for a defined treatment period.

The form of the ventilated space can vary based on the application. For example, for applications involving plasma treatment in the area around holes in panels, e.g. for bonding of nutplates, an applicator including a showerhead outlet comprising a plurality of holes may be used to apply plasma to the area proximate the hole. In this case, the ventilated spacer can be configured as a crenulated lip around the perimeter of the showerhead. The crenulated lip comprises a series gaps for ventilation made in a defined lip height (corresponding to the set separation distance) of a circumferential ring around the showerhead. In another example, a linear beam of plasma can be applied to a large surface area from an applicator employing a slot as the outlet. In this case, the ventilated spacer can be configured as one or more pairs of wheels disposed at opposite ends of the slot. The wheel radius is used to set the separation distance between the outlet and the material surface and the space between the wheels allows for ventilation. In addition, the wheels allow the plasma beam to be rolled over a large surface area.

Another embodiment of the invention is a handheld tool for delivering atmospheric plasma to the surface of fiber-reinforced composites, plastics, and metals prior to the adhesion of nutplates thereto. In order to efficiently deliver plasma gas within the small access spaces where the nutplates are adhered, a showerhead electrode is used with a volume that is less than the access spaces, but large enough to treat the entire area where the adhesive is to be applied.

A compact form factor can be achieved through the incorporation of one or more flow channels to evenly distribute the incoming gas throughout the plasma generating gap within the device. Gas flows through the one or more flow channels into the volume between the power electrode and the ground electrode. The two electrodes are configured such that electrical power is delivered to the inner electrode, and the ground electrode is incorporated into the external housing. The reactive species generated within the ionized gas volume then flows out of the device and onto the composite, plastic, or metal material surface.

Another embodiment of the invention is a handheld plasma tool for treating large areas of materials. This aspect of the invention is useful for manufacturing products where manual labor is the most economical method of production. One example where manual labor is employed is the joining together of the components of a jet aircraft that is made out of carbon-fiber-reinforced composites and lightweight metals.

Another aspect of the handheld plasma tool for treating large areas is the incorporation of a mechanism for scanning the surface of the material at a fixed speed. The scanning mechanism includes, but is not limited to, wheels, driver motors, and electronic control systems that maintain the desired plasma scanning speed and offset distance from the substrate. In another aspect of the invention, the handheld plasma tool includes hardware and software to indicate to the user when the handheld plasma tool is being scanned across the surface at the correct speed and offset distance. The hardware includes, but is not limited to, light-emitting diodes, a digital display, an audible alarm, and other indicators as would be obvious to those with ordinary skill in the art. Another aspect of the invention is the incorporation of a marking device into the hand plasma tool. This device marks the surface of the material after it has been treated with the plasma, so that the operator knows which surfaces the tool has treated.

Another embodiment of the invention includes a nozzle attachment to the handheld plasma tool, where the reactive gas generated by the plasma is concentrated and redirected towards a surface that is difficult to access due to geometric constraints. The nozzle guides the reactive gas from the plasma onto the surface of the material. The benefit of this configuration is to treat the surfaces of work pieces that are not accessible with other plasma devices. The nozzle provides a means of preserving the reactive gas species so that the said gases fully impinge upon the target surface and provide efficient and fast treatment thereof. Various electrode constructs are described herein to achieve the directed reactive gas flow.

The invention is further embodied by a handheld plasma coating tool and its use for depositing thin films onto substrates (material surfaces). The coating is generated when reactive gas exits the plasma and mixes with a precursor chemical injected into the gas flow. A chemical reaction between the reactive gaseous species generated by the plasma causes the precursor chemical to decompose and deposit a thin film onto the substrate. An example of this embodiment of the invention is the deposition of a glass-like film onto a material by injection of a volatile organosilicon compound into the reactive gas stream generated from an oxygen and argon plasma. The glass-like coating can be used to promote adhesion on difficult to bond substrates, or as a protective layer against corrosion. Another example of an embodiment of this invention is the deposition of a non-stick coating onto a material by injection of a fluorocarbon molecule into the reactive gas stream generated from a hydrogen and argon plasma. The non-stick coating can be used as a permanent mold release. Many other coatings may be deposited with the handheld plasma tool without deviating from the scope of the invention.

Example 1—Handheld Plasma Tool for Nutplate Installation

A schematic of the handheld plasma tool is shown in FIG. 1. In this figure, the handheld tool features: a hand grip (1) for holding the device; a trigger (2) for turning the plasma on and off; a gas inlet (3); a connector for the electrical power (4); one or more light-emitting diodes (LEDs) (5) to indicate the process status to the operator; a display (6) for indicating the process recipe and for data monitoring; a plasma showerhead (7) applicator; an indexing tip (8) for engaging a hole in the material surface to align the plasma showerhead (7) directly over the nutplate hole; an articulating clamp (9) (part of the applicator) that positions the plasma showerhead (7) over the material surface, and once actuated, sets the plasma showerhead (7) at the desired distance from the material surface by virtue of the crenulated lip (10) which functions as a ventilated spacer.

To operate the handheld plasma tool illustrated in FIG. 1, the operator inserts the indexing tip (8) into the nutplate hole in the metal or composite panel. The articulating clamp (9) automatically positions the plasma showerhead (7) over the surface surrounding the hole on the backside of the panel. Next, the operator pushes the trigger (2) to start the process. The clamp (9) activates and presses the plasma showerhead (7) against the surface with a predetermined force. A crenulated lip (10) around the showerhead automatically sets the source-to-sample distance. The plasma turns on and delivers the reactive gas to the surface for a desired period of time, from 1 second to 1 minute, or alternatively for 1 second to 15 seconds. After the desired time has past, an LED (5) flashes indicating the treatment is done. The plasma turns off, the clamp (9) retracts, and the operator is ready to move on to the next nutplate hole. Note that the human element in this process is kept to a minimum so as to reduce costs and maximize reliability.

Figure 2:
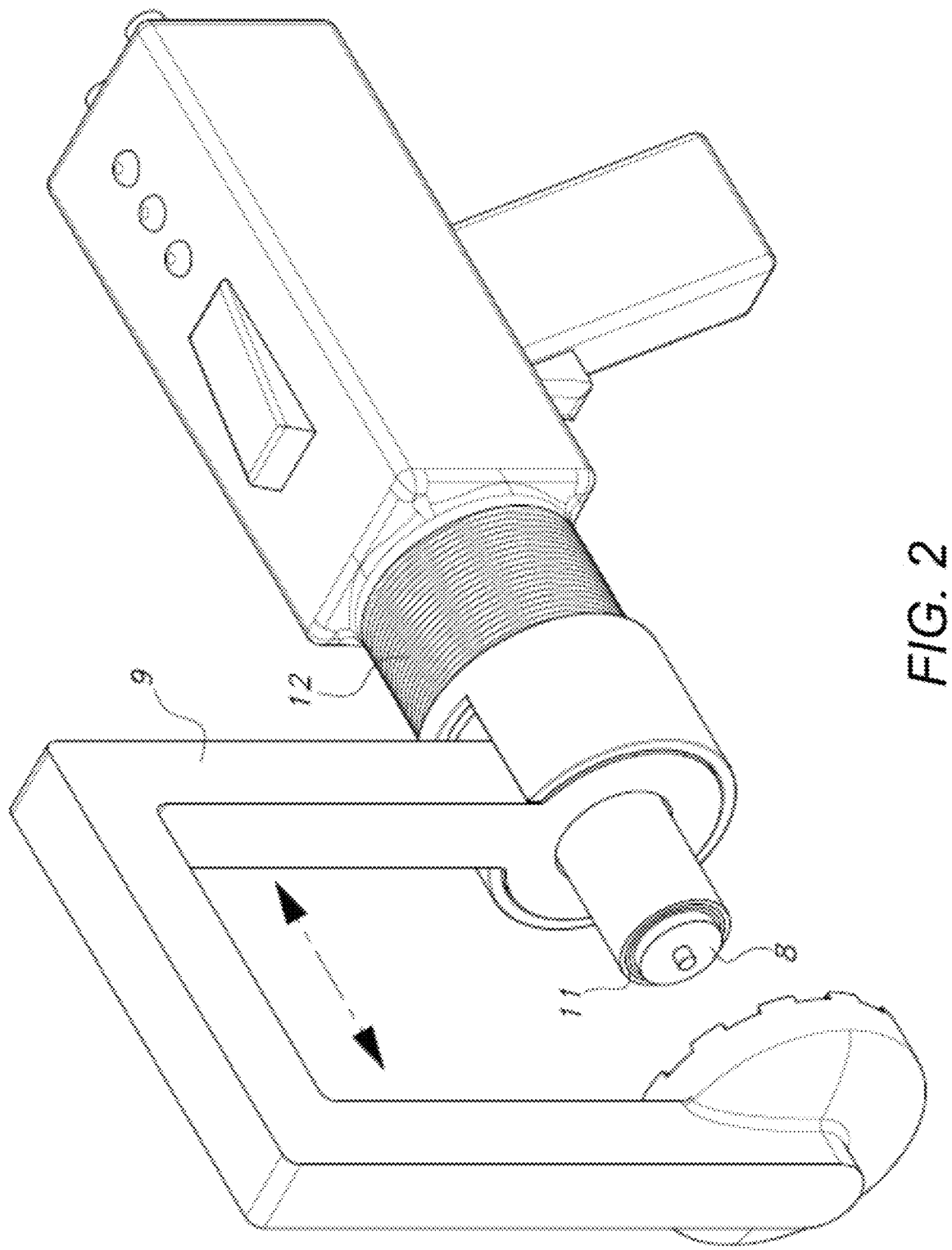
FIG. 2 is an illustration of the handheld plasma tool with an articulating head that positions the plasma showerhead on the backside of a composite. Opposite the plasma showerhead is an indexing tip that fits into the fastener hole to properly position the plasma over the area that requires surface treatment. A marking ring is also shown, which leaves a mark on the material surface to indicate that it has been treated and is ready to bond.

A close up view of the indexing tip (8) is shown in FIG. 2. This tool is equipped with a marking ring (11) that automatically extends out at the end of the plasma treatment, and leaves a mark on the panel surface indicating that the nutplate bond area has been cleaned and activated. The indexing tip (8) is interchangeable with tips of different diameters to allow the operator to accurately and securely align the plasma tool over nutplate holes of any size. This tip can also be constructed in the shape of a cone and with facets so that it fits into a series of holes of different sizes. The textured positioning ring (12) allows the operator to align the articulating clamp (9) with the orientation of the panel being treated.

Figure 3:
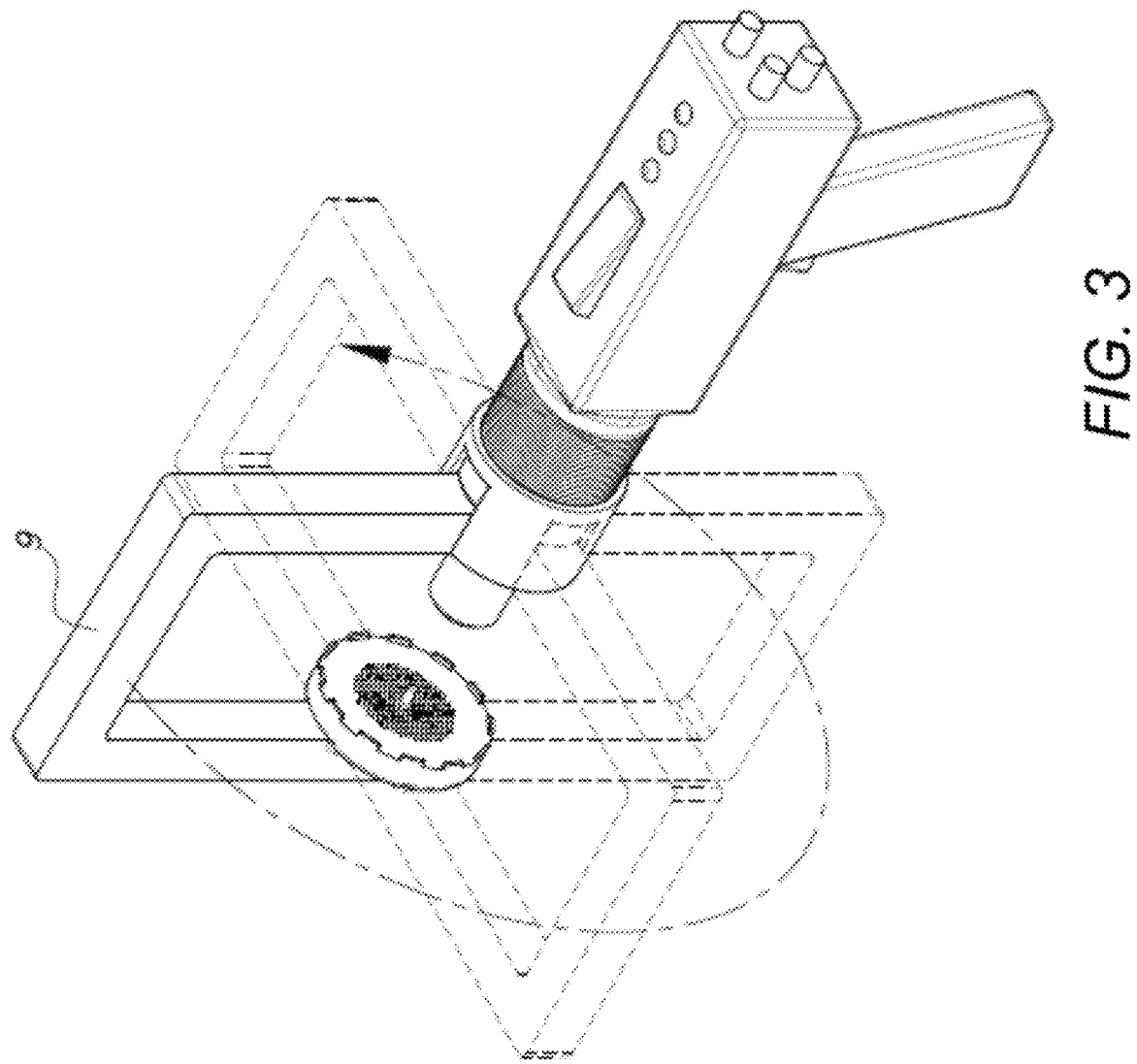
FIG. 3 shows that the articulating head can be rotated 270 degrees to enhance access to the backside of the composite or metal panel.

FIG. 3 illustrates the tool's capacity to rotate the articulating clamp (9) by 270 degrees. This allows for ergonomic surface preparation for panels with nutplate holes that are oriented along the top horizontal edge (0°), right vertical edge (90°), bottom horizontal edge (180°), and left vertical edge (270°) of the panel. The operator is able to access holes in different positions on a structure without adding stress to his wrist, elbow or arm.

Figure 4:
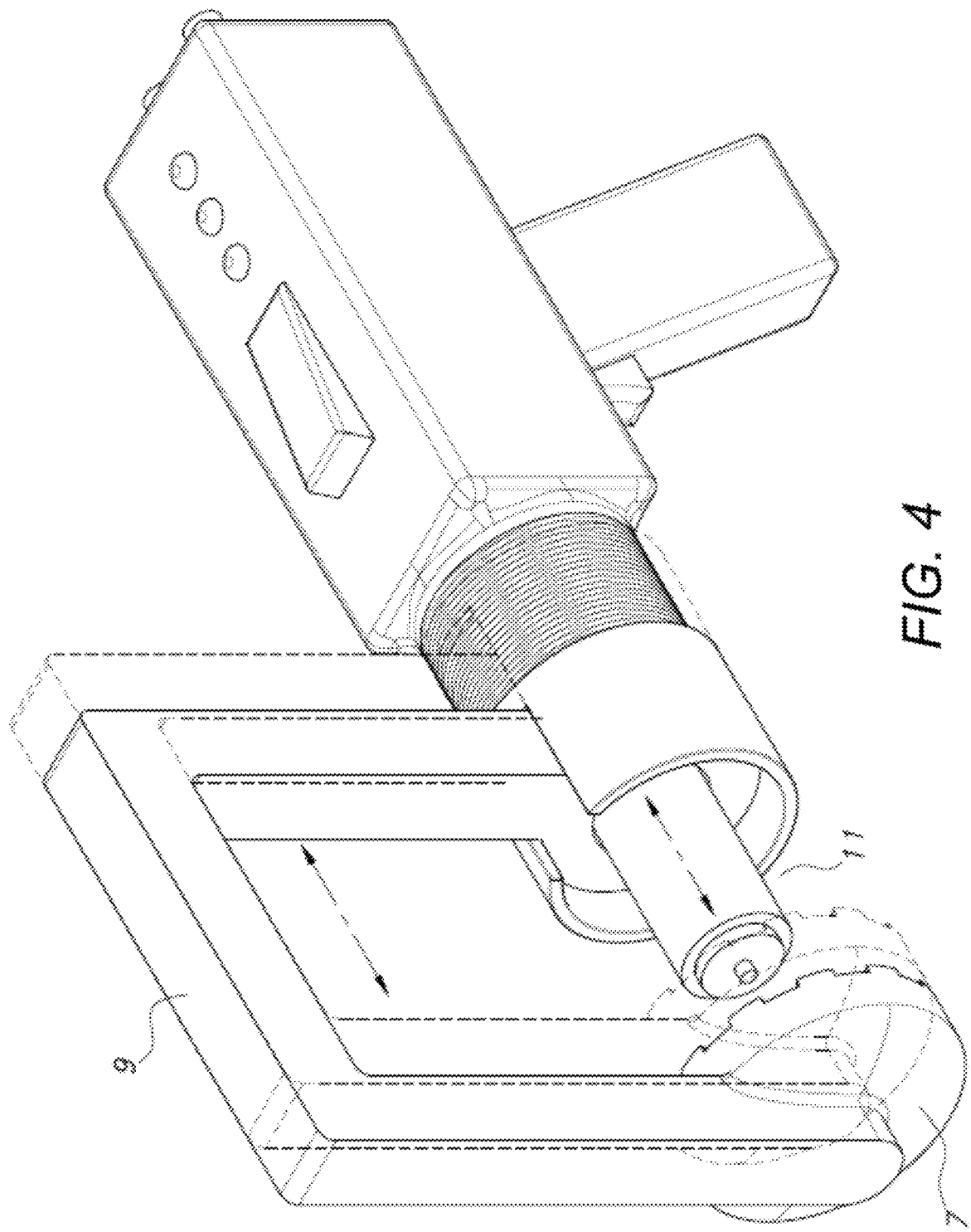
FIG. 4 is an illustration of the handheld plasma tool with the articulating head, showing that it can be activated to clamp down on the panel, and thereby position the plasma showerhead at the optimal distance from the surface for rapid treatment.

Actuation of the clamp (9) and the marking ring (11) is shown in FIG. 4. Upon pushing the start button, pneumatic or electronic actuation retracts the clamp (9) until the crenulated lip (10) on the plasma showerhead (7) comes in contact with the surface being treated. The tool's clamping mechanism allows it to automatically adjust to panels of differing thickness. A predetermined pressure is maintained on the clamp (9) in order to secure the tool in place while treatment occurs. When plasma treatment is completed the marking ring (11) actuates to mark the panel and show the operator that the nutplate hole area has been cleaned and activated for bonding. Methods of marking the panel surface include, but are not limited to, stamping with ink, laser scribing, and mechanical scribing. Once the part surface has been marked, the clamp (9) and marking ring (11) retract, and allow the tool to be moved to the next nutplate hole for treatment.

A model of the plasma showerhead (7) that is incorporated into the distal end of the articulating clamp (9) is shown in FIG. 5. The showerhead (7) has a compact form that allows it treat panels with very little access space near the nutplate hole. The dimensions of the showerhead (7) are in the range of 10 to 50 mm in diameter, and 5 to 20 mm in thickness. Contained within the device are perforated powered and grounded electrodes spaced at a uniform distance apart. The gas is supplied at the other end of the clamp through connection (84), and flows through tubing (82) to the electrodes located behind the showerhead (7). The powered electrode is supplied with radio frequency (RF) electrical power through line (81) located inside the clamp. The RF power supply (85) connects to line (81) at the end of the clamp opposite to the showerhead. When gas flows through the device, and RF power is supplied to the electrodes, the gas forms a plasma discharge in the gap between the powered and grounded electrodes and is ionized by applying an electrical signal to the powered electrode. Neutral reactive species are generated in the plasma, which then flow out of the showerhead (7) and treat the surface of a material that is pushed up against the crenulated lip (10). An optical sensor may be incorporated into the plasma showerhead (7) behind the powered electrode. The optical sensor cable (83) passes from the showerhead inside the clamp to the connection (86). When the plasma is on, the sensor sends a signal back to the plasma controller, which records the "plasma on" state.

Figure 5A:
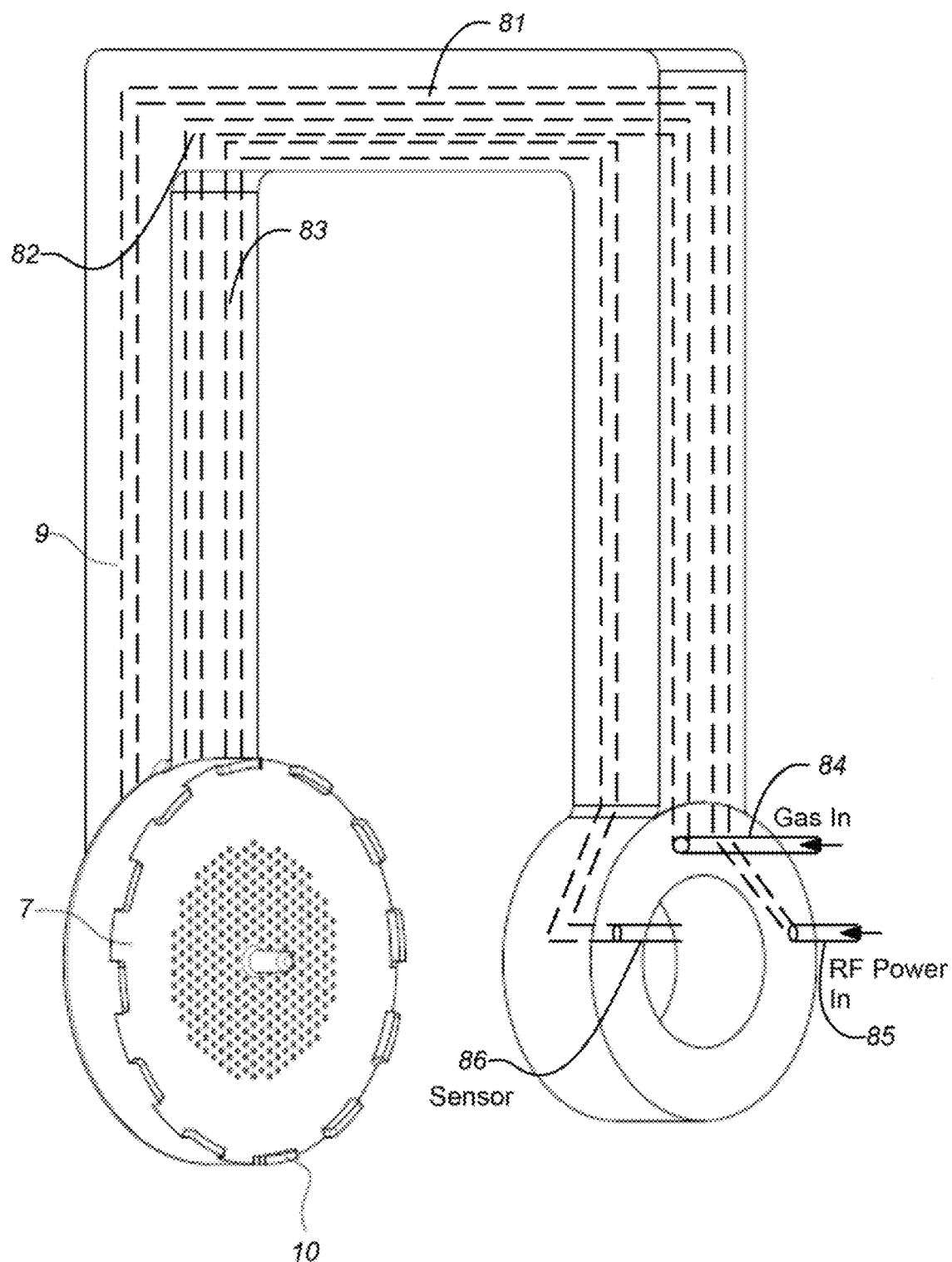
FIG. 5A is a drawing of a plasma showerhead that is small and compact inside for fitting into tight spaces, while at the same time treating the entire bond area for a nutplate.
Figure 5B:
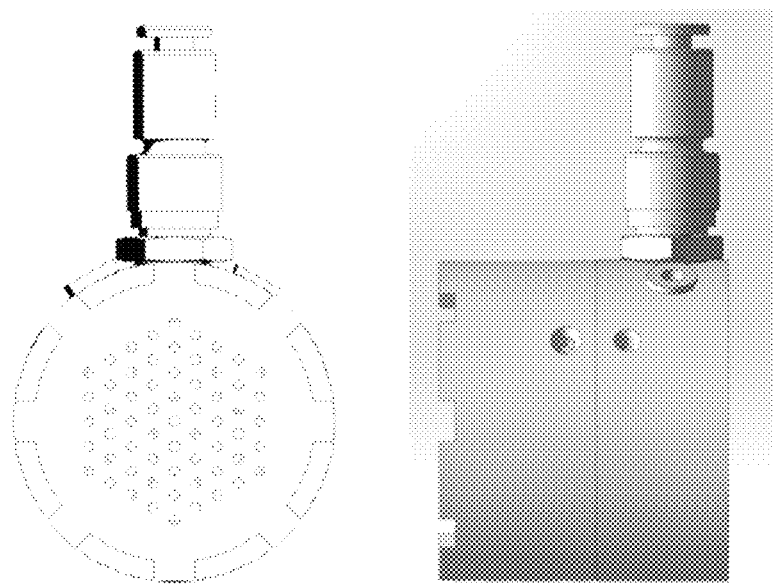
FIG. 5B is a drawing of detailed example plasma showerhead.
Figure 5C:
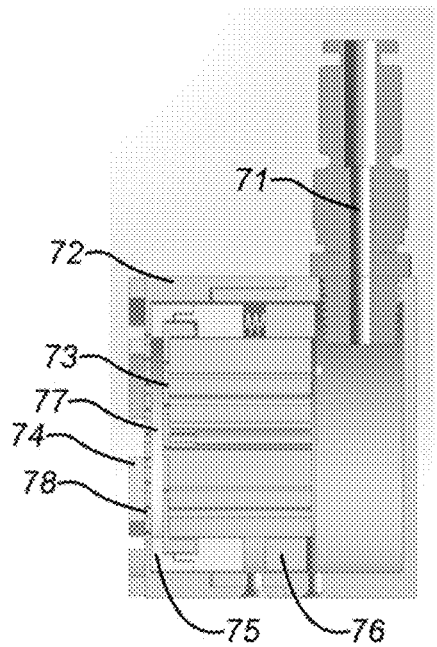
FIGS. 5C and 5D are drawings of the detailed example plasma showerhead showing the internal features of the device, including the powered and grounded electrodes.
Figure 5D:
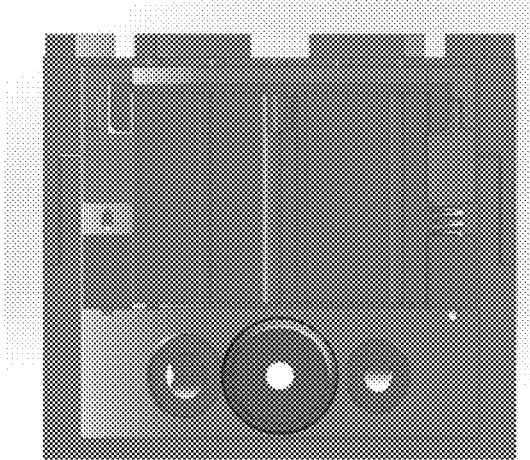

Drawings of a detailed example plasma showerhead that embodies the invention are presented in FIGS. 5B to 5D. The compact showerhead has a gas inlet (71) for introduction of the gas used to generate the plasma. The gas is comprised of a mixture of inert gas, including helium or argon, and from 0.0 to 5.0% of a molecular gas, including but not limited to, oxygen, nitrogen, hydrogen, carbon dioxide, nitrous oxide, and ammonia. The gas inlet is attached to a metal housing (72), which also serves as the grounded electrode for the plasma. The grounded electrode is spaced apart from a powered electrode (73). The powered electrode has a means of attaching to radio-frequency electrical power. The powered electrode has openings in it to allow the gas to flow into the gap (77), wherein the plasma is generated by application of said electrical power. The grounded electrode housing (72) is electrically isolated from the powered electrode (73) by an insulating spacer ring (75). The spacer ring (75) is designed to maintain the gap spacing between the grounded housing (72) and the powered electrode (73). It is held in place by an insulating backup ring (76). The grounded electrode housing (72) has openings (78) to create a showerhead that allows the reactive species generated by the plasma in the gap (77) to flow out of the housing. A crenulated lip (74) is disposed around the perimeter of the housing (72). The crenulated lip (74) has a thickness of 0.5 to 6.0 mm, preferably between 2.0 to 4.0 mm. When cleaning and activating the material surface of a substrate, the substrate is pushed up against the crenulated lip (74) so that the distance between the material surface and the gas outlet holes (78) is the same as the thickness of the crenulated lip, between 0.5 and 6.0 mm, preferably between 2.0 and 4.0 mm. This ensures uniform and rapid treatment of the material surface, so that it is properly prepared for bonding to an adhesive.

Figure 6:
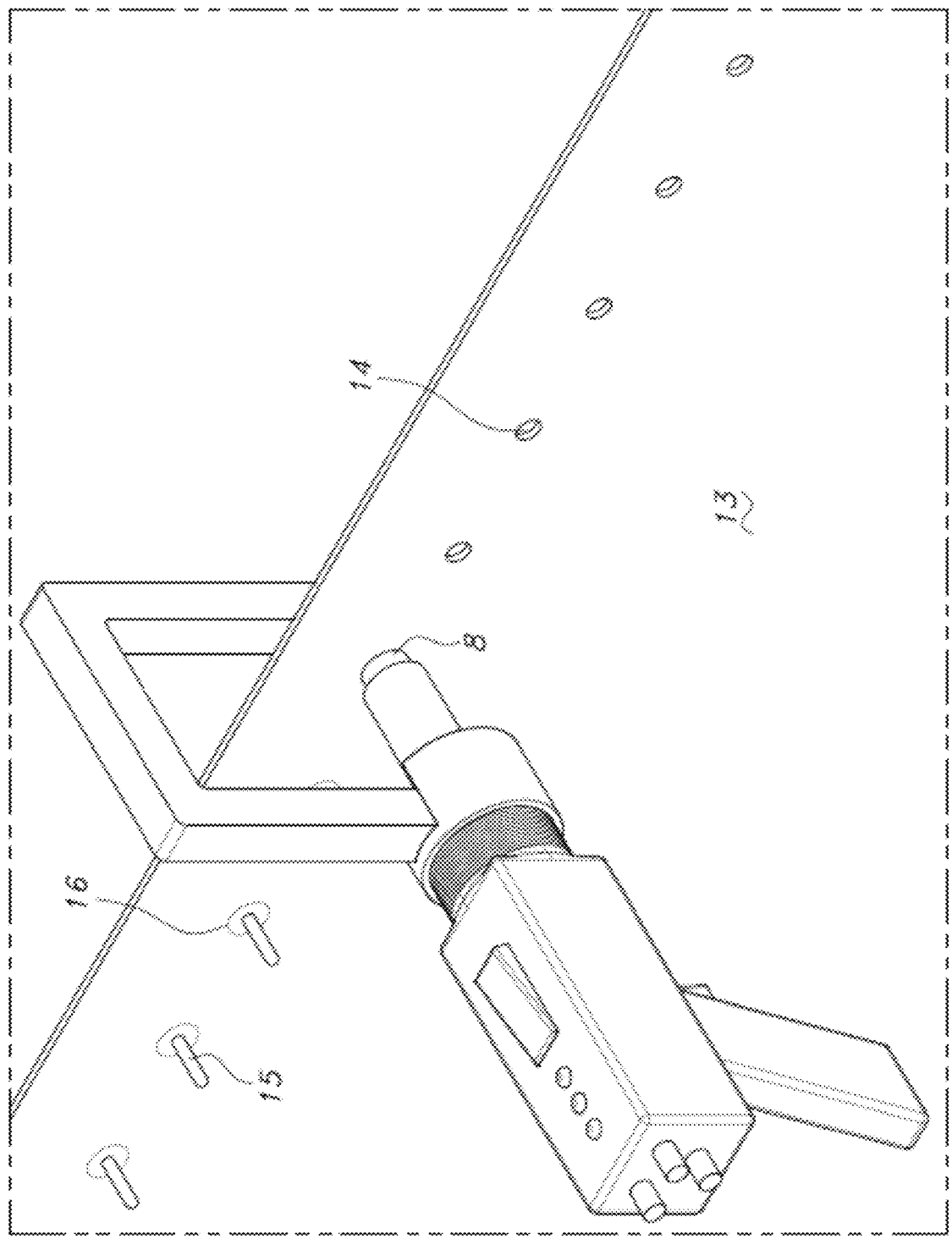
FIG. 6 is an illustration of the handheld plasma tool with the articulating head treating the backside surface of a panel where a fastener or nutplate will be inserted and bonded.

FIG. 6 is an illustration of the handheld plasma tool with articulating head that positions the plasma nozzle on the backside of a composite, plastic, ceramic, or metal panel. In this illustration the handheld plasma tool is being implemented to prepare a carbon-fiber-reinforced composite panel (13) that nutplates are being bonded to. In this example, the indexing pin (8) has been placed into a nutplate hole (14) and the trigger (2) has been engaged to activate the articulating clamp (9) to close around the composite panel (13). The illustration also features bonded nutplates (15) on the back side of the panel which show the ink marking (16) on the panel surface indicating successful treatment.

Figure 7:
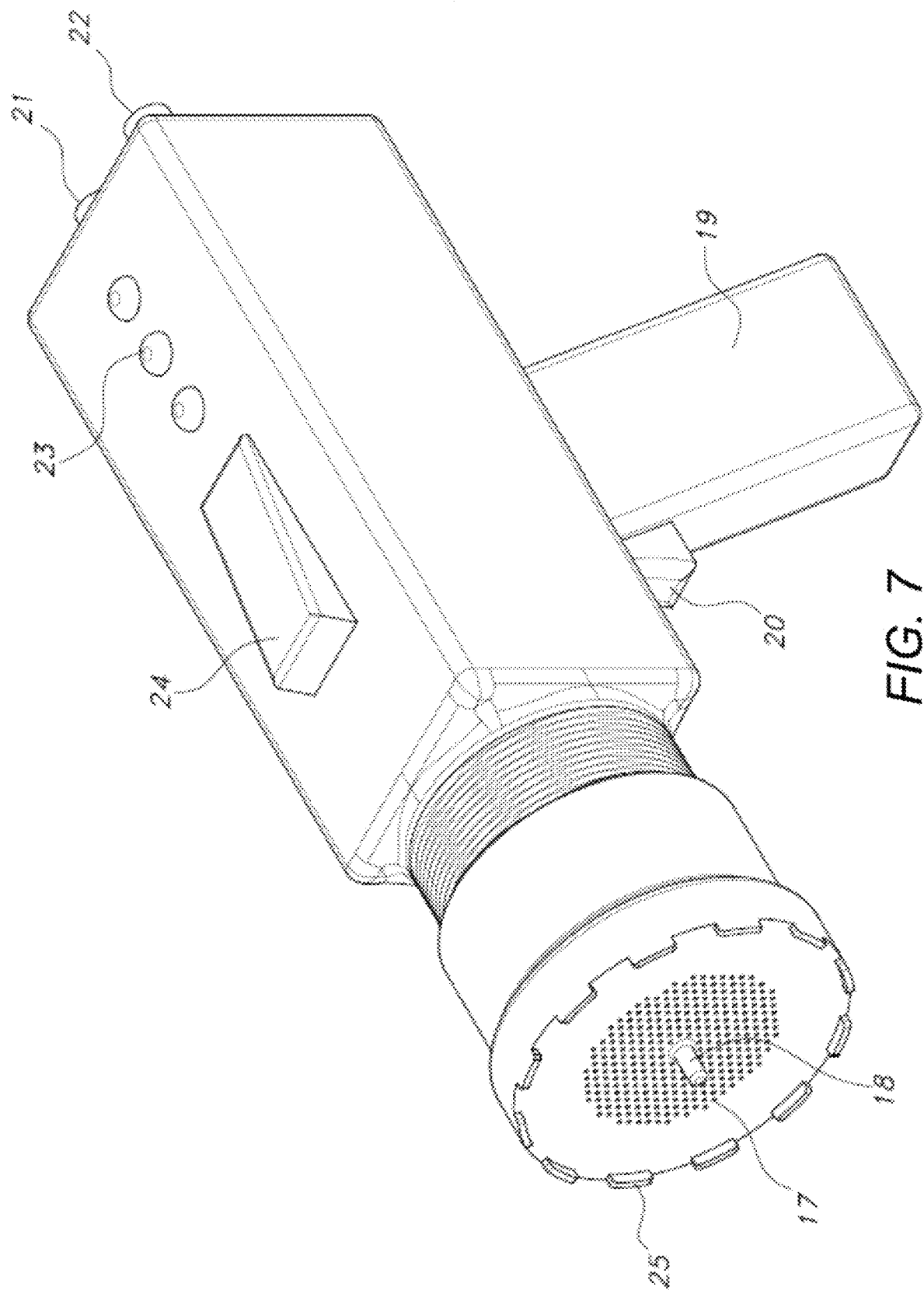

In another embodiment of the invention, the tool does not feature an articulating clamp (9) to go around the back of the substrate. This embodiment of the invention is a handheld tool designed to process a substrate by centering around and treating a front-facing hole. A handheld tool configured to treat the front facing side of a metal or composite panel for nutplate installation is shown in FIG. 7. Plasma is generated within a showerhead source design (17) to generate reactive gas. The plasma head features an indexing tip (18) at the center to locate the plasma head over nutplate holes to be treated. The handheld tool also features: a hand grip (19) for holding the device; a trigger (20) for initiating and concluding plasma generation; a gas inlet (21) and electrical power connections (22); light-emitting diodes (23) to indicate the process status to the operator; a display (24) for indicating the process recipe and for data monitoring; and a crenulated lip (25) to set the plasma showerhead (17) at the desired distance from the substrate.

Figure 8:
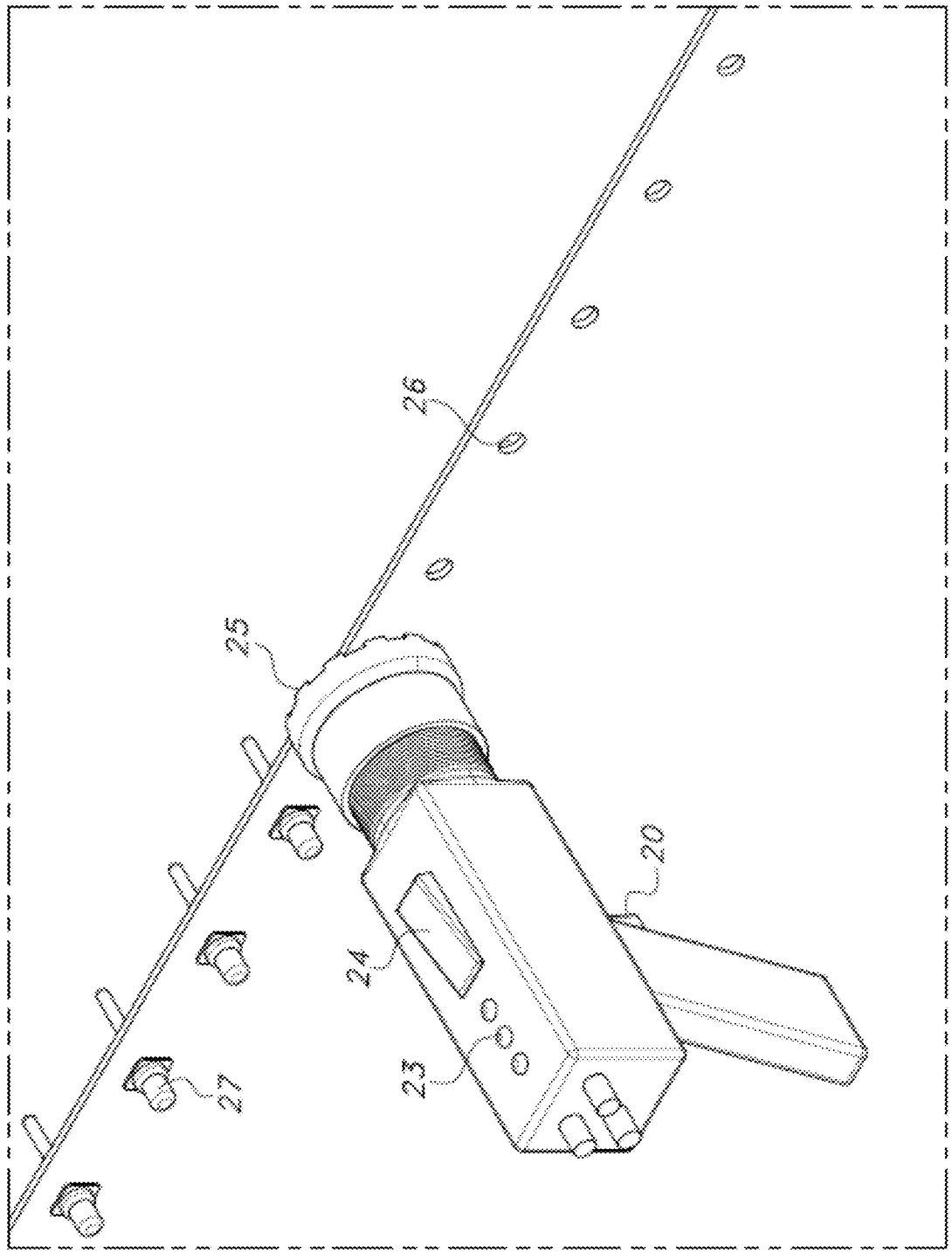
FIG. 8 shows an illustration of the handheld plasma tool treating the front side of a panel where nutplates are being installed and bonded.

Shown in FIG. 8 is the front-facing, handheld plasma tool being used to prepare a metal panel. To use the handheld plasma tool, the operator positions the plasma head by inserting the indexing tip (18) into the nutplate hole (26) in the panel. The indexing tip (18) is conical and is interchangeable with tips of different diameters to allow the operator to accurately and securely align the plasma tool over nutplate holes of any size. The crenulated lip (25) around the showerhead is threaded so that the operator can adjust the tool for the desired distance from the plasma head to the metal surface. Once secured, the crenulated lip (25) automatically sets the source-to-sample distance. The operator engages the trigger (20) to start the plasma process and deliver reactive gas to the surface for a desired period of time, which is set through the display (24). After the desired time has passed, an LED (23) indicates that treatment is done. The operator is now ready to install the nutplate (27) into the hole.

Example 2—Handheld Plasma Tool for Treating Holes

Figure 9:
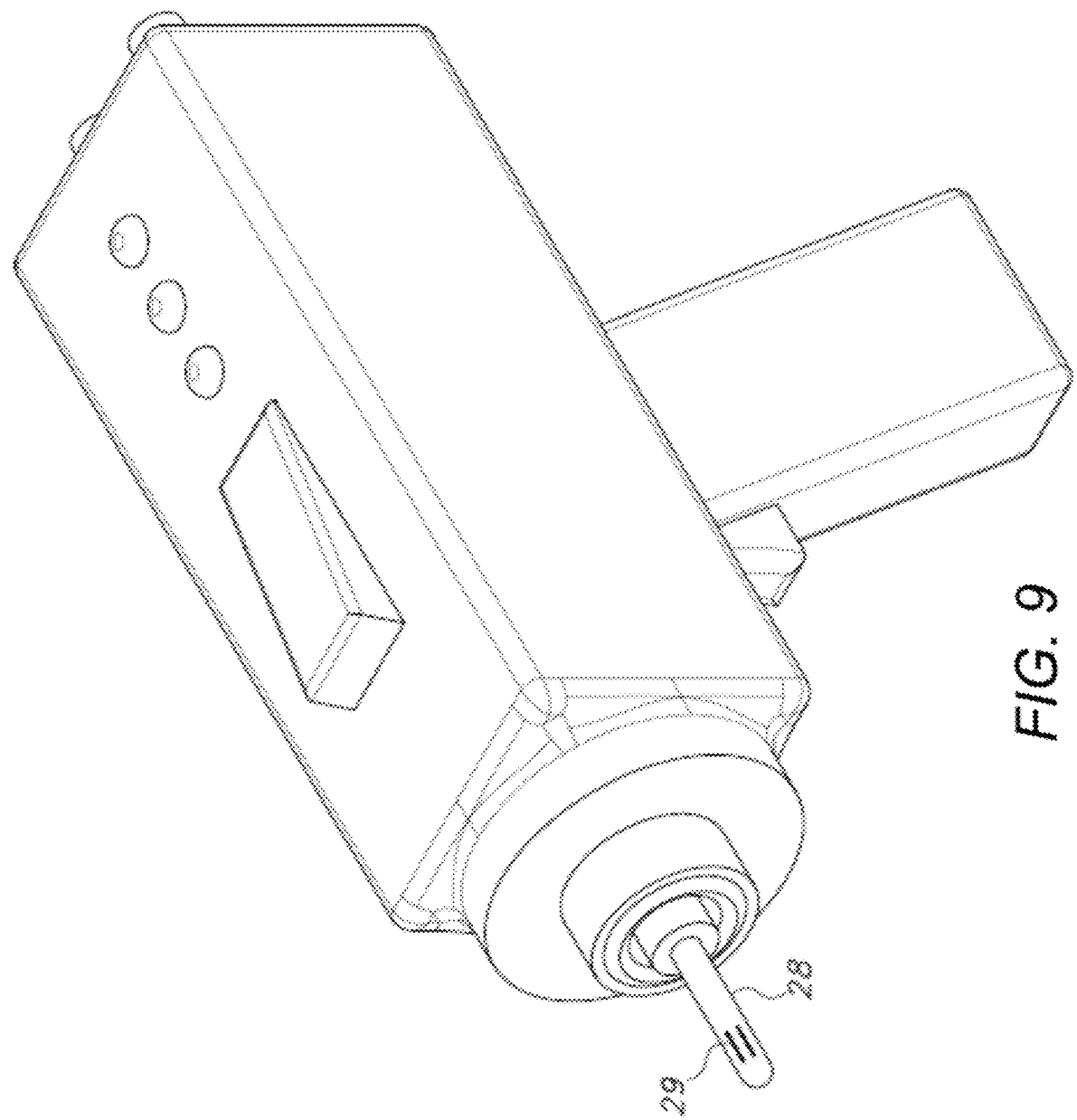
FIG. 9 is an illustration of a handheld plasma tool for cleaning and activating the surfaces inside a hole prior to adhesively bonding a wire, fastener or other object into the hole. The tool tip has slots in it where the plasma is generated and flows out to uniformly treat the sidewalls of the hole.

A further embodiment of the invention is to replace the showerhead plasma source (17) and indexing tip (18) with a small cylindrical plasma nozzle (28), as shown in FIG. 9. The cylindrical plasma nozzle (28) is constructed with small slits (29) to emit reactive gases in a uniform radial direction around the tip. This handheld plasma tool is effective at cleaning and activating the inside surface of a small hole. The operator turns the plasma on and inserts the nozzle tip into the hole, moving it slowly up and down to ensure that the entire inner surface has been treated. After a short exposure time, the handheld plasma is turned off, and a wire, fastener, or other object inserted into the hole and the hole filled with an adhesive to permanently seal in the cavity.

In this example, the plasma is developed within the device from a gas flow in a gap between a powered electrode and a grounded electrode when the powered electrode is coupled to radio frequency electrical power. The hollow indexing tip is coupled to the plasma source with at least one opening in it such that the reactive gas from the plasma can flow out and contact the surface area of the hole in the material to be treated.

Example 3—Handheld Plasma Tool for Surface Treatment

Figure 10:
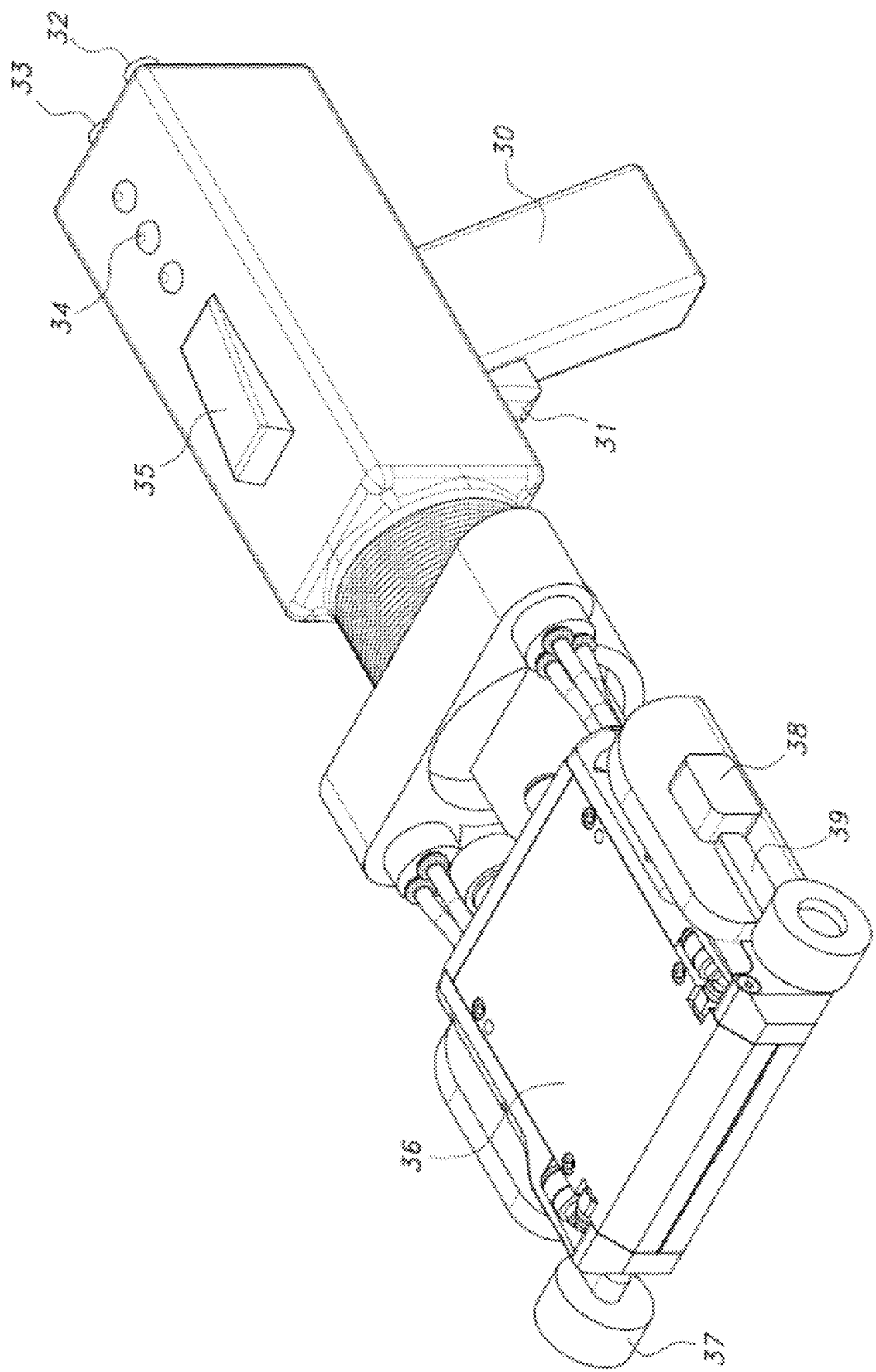
FIG. 10 is an illustration of a handheld plasma tool for cleaning and activating a strip of material between 25 mm and 150 mm wide. The tool is equipped with rollers that cause the plasma head to stay at a fixed distance from the material surface, between 1.0 and 10.0 mm.

The invention involves a novel low-temperature, atmospheric pressure plasma tool, which is handheld, self-propelled and portable. FIG. 10 is a model of the handheld scanning plasma tool. The tool incorporates a number of key features to facilitate repeatable plasma exposure. In this figure, the handheld tool features: a hand grip (30); a trigger (31) for turning the plasma on and off and initiating movement; a gas inlet (32); a connector for electrical power (33); light-emitting diodes (34) to indicate the process status to the operator; a display (35) for indicating the process recipe and for data monitoring; a linear beam plasma applicator (36); one or more pairs of wheels (37) with motors (38) to drive the motion of the tool; and a set of actuated rails (39) to maintain the proper distance from the substrate to the plasma head.

As previously mentioned, in this embodiment the ventilated spacer is formed by the pair of wheels disposed at each end of the slit outlet from the linear beam plasma applicator (36). Similar to Example 1, plasma is formed within the applicator to be directed from the outlet onto the material surface. The applicator develops the plasma having the reactive gas from a gas flow directed from the handheld device through the gas passage and into a gap between a powered electrode and a grounded electrode when the powered electrode is coupled to radio frequency electrical power. Thus, in this embodiment, the ventilated spacer comprises one or more pairs of wheels affixed to the applicator to translate the apparatus along the material surface whilst maintaining the defined distance between the outlet and the material surface.

To operate the handheld plasma tool as illustrated in FIG. 11, the operator places the self-driving wheels (37) onto the metal or composite panel (40). The handheld plasma tool features a display screen (35) which allows the operator to monitor or select plasma operating parameters including, but not limited to: scanning speed, plasma head-to-panel distance, electrical power, and gas flow rates. After the operator pushes the trigger (31) to start the process, the actuating wheels (39) are able to move in and out of the body to position the linear beam plasma applicator (36) at the proper distance from the surface being treated. Next, the plasma turns on to deliver reactive gas to the surface and the wheels begin to move at the desired speed, ranging from 1 mm/s to 100 mm/s. The strip area (41) shown in FIG. 11 indicates the area of the panel (40) that has been cleaned and activated by plasma treatment. When the operator is finished scanning the material with plasma, he presses the trigger (31) and the plasma turns off and the wheel stop moving. This type of handheld plasma tool is easy to use and cost-effective. It provides reliable surface treatment by minimizing human interaction with the material surface.

The wheels mounted on the tool (37) can be motorized to propel the tool and control the scanning speed but this is not required. In one embodiment, electric motors (38) will drive the wheels (37) on the plasma tool to maintain this speed when plasma treatment commences. Measurement of the scan speed can be accomplished through a number of mechanisms including but not limited to the use of toothed gear tachometers, encoders, optical sensors, or magnetic sensors on the wheels.

In a variant of this embodiment of the invention, the plasma tool is not self-propelled but is instead pushed by hand. The three colored LEDs (34) can be illuminated to provide visual feedback to indicate that treatment is proceeding correctly. A central light illuminates when scanning at the correct speed, while an upper and lower light indicates when the operator is scanning at a rate that is too high or too low, respectively. Additionally, audio feedback can be provided to the operator, which gives off an alarm when the scanning speed is outside of the specified range. Upon hearing the alarm, the operator modifies the tool motion to bring it back within specifications.

In another embodiment, the height of the wheels (37) can be manually adjusted before the plasma treatment commences. The mounting bracket (39) contains spring-loaded pins and multiple holes that allow the operator to select a fixed plasma head-to-substrate distance (the defined distance) between 1 and 10 mm. For example, the operator may choose a setting of 4 mm from the surface by snapping the pins into the proper hole on the mounting bracket (39). Then the operator turns on the handheld plasma tool and rolls it back and forth over the substrate to complete the surface treatment.

The handheld plasma tool enables the operator to adjust the wheels (37) for maintaining a desired distance of the plasma head from the surface being treated. In one embodiment, a distance sensor is mounted beneath the plasma applicator which allows the system to monitor the offset from the surface and actively adjust to the desired distance. When the distance to the substrate exceeds the acceptable tolerance from the set point, a signal is sent to a controller so that the actuators move the plasma head (36) along the rails (39) back to the proper distance. One embodiment is to use an optical element mounted beneath the plasma head. This device projects light onto the substrate and senses the amount of reflected light. Alternatively, time-of-flight sensors can be used to measure the time it takes for light to reflect off a surface and return to the sensor.

The invention features a non-destructive method integrated into the handheld plasma tool for marking the surface. Mechanisms which can be used for marking the material include, but are not limited to, ink that is impregnated into the wheels (37) and can be stamped adjacent to all plasma treated areas; a mechanical scribe affixed to the applicator or wheels that traces out the path of the plasma tool across the material; or a laser that etches a pattern into the material being treated. In addition, a digital thread may be used to track the handheld plasma tool as it traverses over the surface. A computer is then used to track and record the position of the tool on the part. This is especially useful when plasma treatment is required on long, straight bond lines, including the ribs, spars and skins of an aircraft wing, tail, or fuselage.

Example 4—Handheld Plasma Tool with Gas Distribution Nozzles

In yet another embodiment of the invention, the substrate is a three-dimensional object with no restriction on its size or shape. The plasma tool is used to treat selected areas of the three-dimensional object that are in corners or recesses and are difficult to access. Embodiments of the invention can be used to produce reactive gaseous species in the plasma effluent and deliver them through a nozzle to a substrate surface in high concentration. In addition, the nozzle prevents the plasma effluent from mixing with the surrounding air. When contact between the reactive gas and ambient air is minimized, the reactive species survive until impinging on the material surface.

Figure 12B:
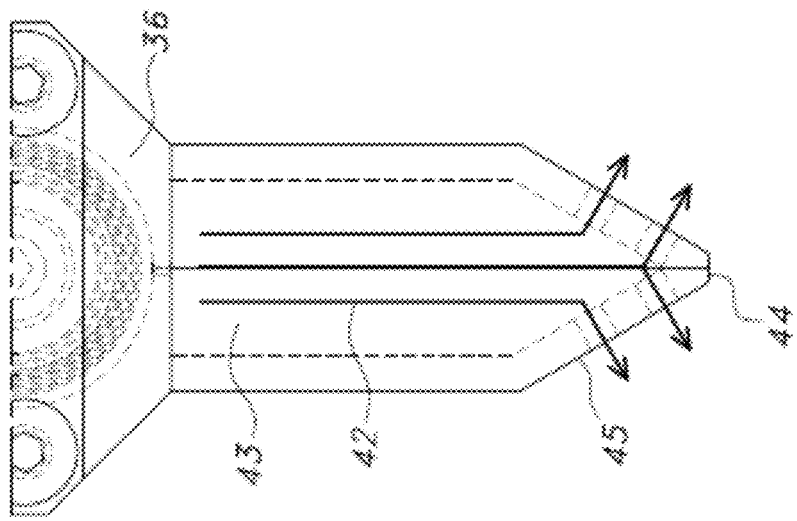
FIGS. 12A and 12B are illustrations of a nozzle attached to the handheld plasma tool for cleaning and activating material in corners or other tight spaces.
Figure 12A:
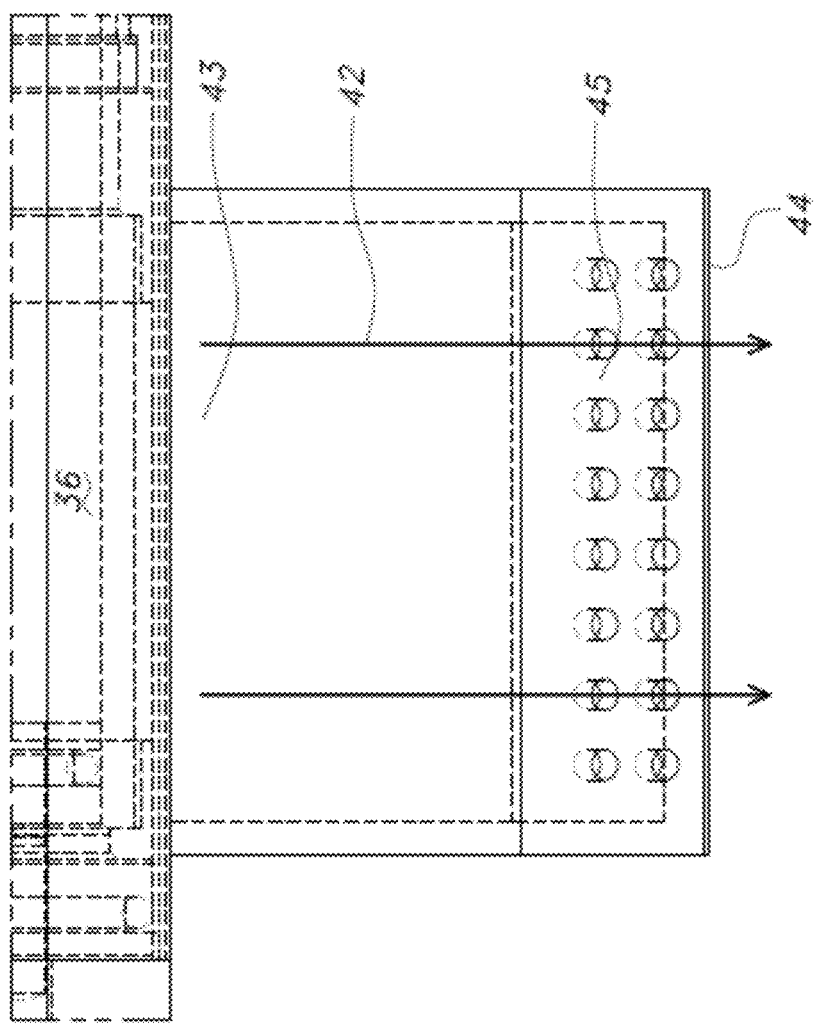

Shown in FIGS. 12A and 12B is a nozzle attached to the handheld plasma tool that distributes the reactive gas into tight corners. The drawing includes an atmospheric pressure, linear beam plasma head applicator (or source) (36), and a nozzle (43) with a narrow tip (44), and gas outlet holes (45). Reactive gases (42) from the plasma flow through the nozzle (43) and out the holes (45).

Figure 13:
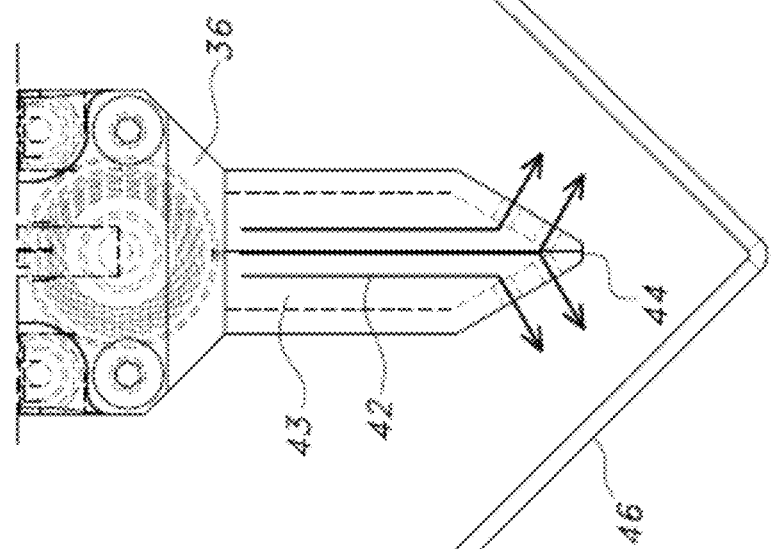
FIG. 13 is an illustration of the handheld plasma tool with the nozzle treating the corner of a composite frame prior to bonding.

FIG. 13 shows the handheld plasma tool with linear beam applicator source (36) and nozzle (43) treating the corner of a composite frame (46) prior to bonding. In this example, the corner angle is 90°. The narrow tip (44) of the nozzle (43) provides easy access of the reactive gas (42) to the surface of the material in the corner. The example shown is not meant to limit the scope of the invention as corners with other interior angles may be treated with the nozzle (43). In addition, other nozzle detailed design variations may be utilized within the scope of the invention as will be understood by those skilled in the art.

Figure 14:
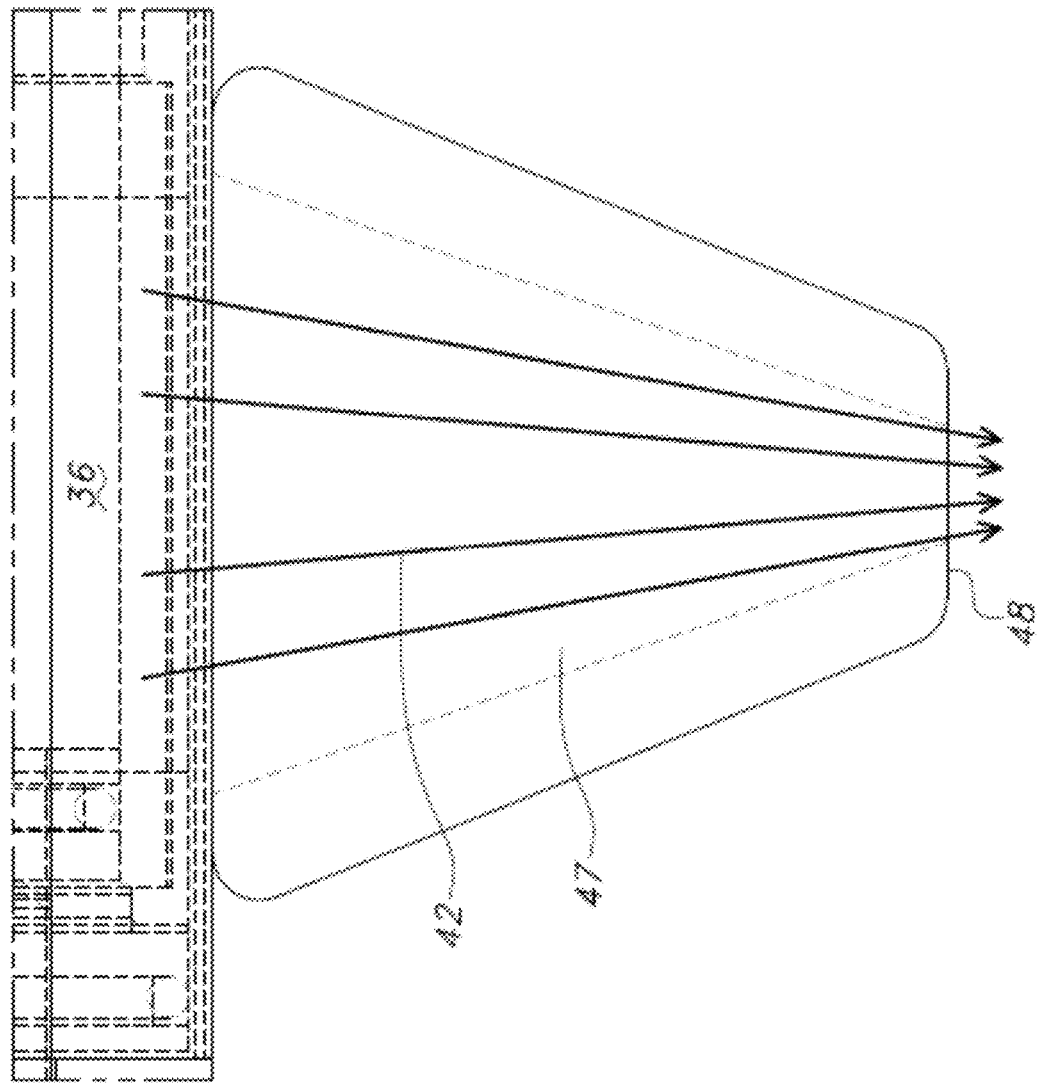
FIG. 14 is an illustration of a handheld plasma tool equipped with a nozzle for compressing the reactive gas down into a small spot to provide more concentrated and faster surface treatment.

In order to enhance the density of reactive species delivered to the surface, a constricting nozzle can be attached to the handheld plasma tool as shown in FIG. 14. In the schematic the plasma source (36) generates a flow of reactive gaseous species (42). The gaseous species (42) flow out of the plasma head and into the nozzle (47). The interior of the nozzle is hollow and narrows to a point. Reactive gas is driven out through the exit hole (48) at an accelerated rate directly onto the substrate being treated. The increased gas velocity serves to reduce the amount of time that passes from when the gas exits the plasma applicator to when it impinges on the workpiece surface. This is especially important to prevent reactive species decay when treating areas where geometric restrictions prevent the plasma applicator (36) from getting close to the surface.

Figure 15:
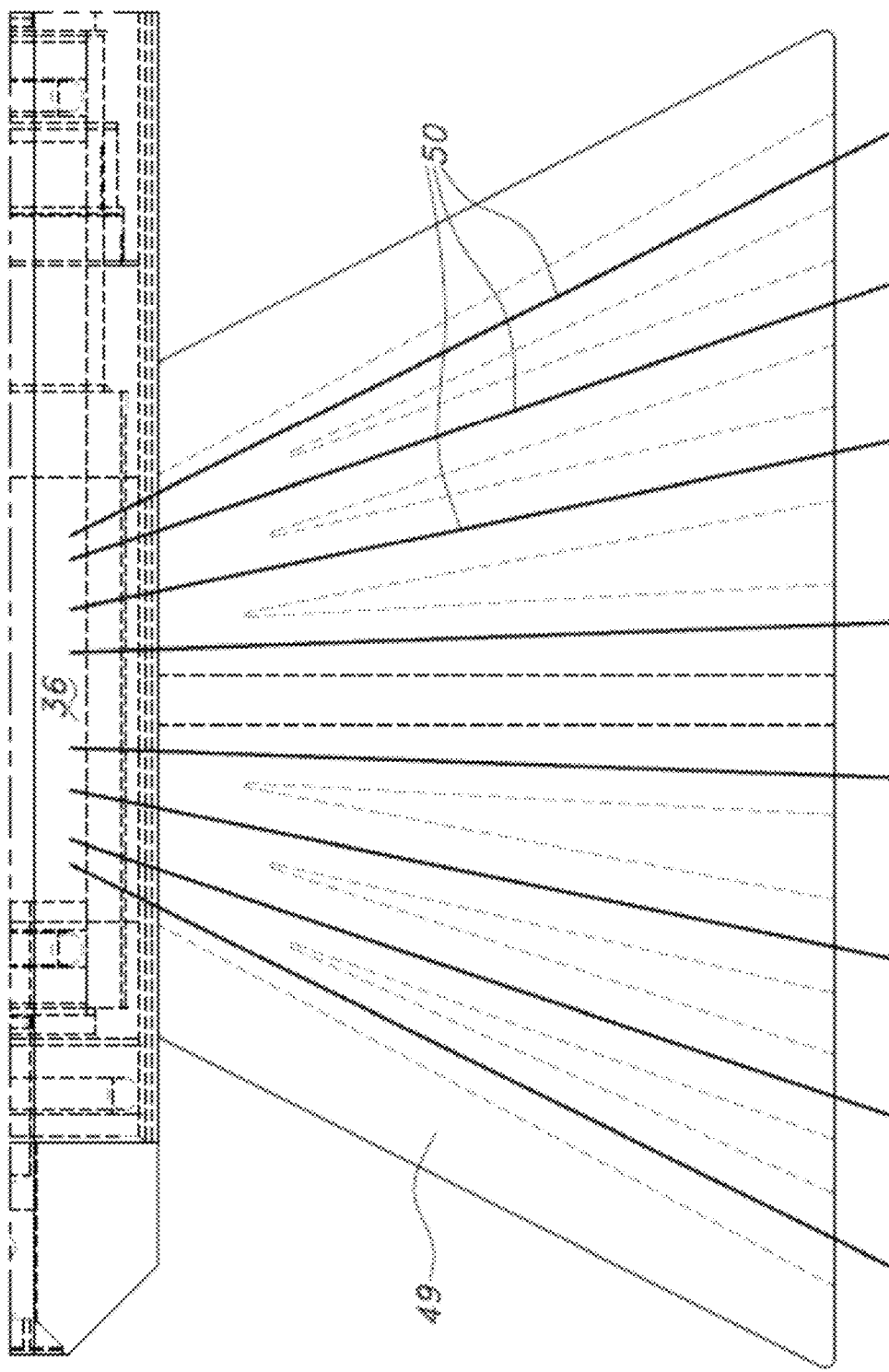
FIG. 15 is an illustration of a handheld plasma tool equipped with a nozzle for expanding the reactive gas flow to a wider width to provide more economical surface treatment.

FIG. 15 shows a schematic of another embodiment of the invention. Here the reactive gas (42) exits the plasma source (36) and is passed through a nozzle (49) to expand the cross-sectional area for flow of the reactive gas. The fan shaped flow channels (50) allow the gas to contact a larger area of the substrate than would be treated if no nozzle was used.

Figure 16:
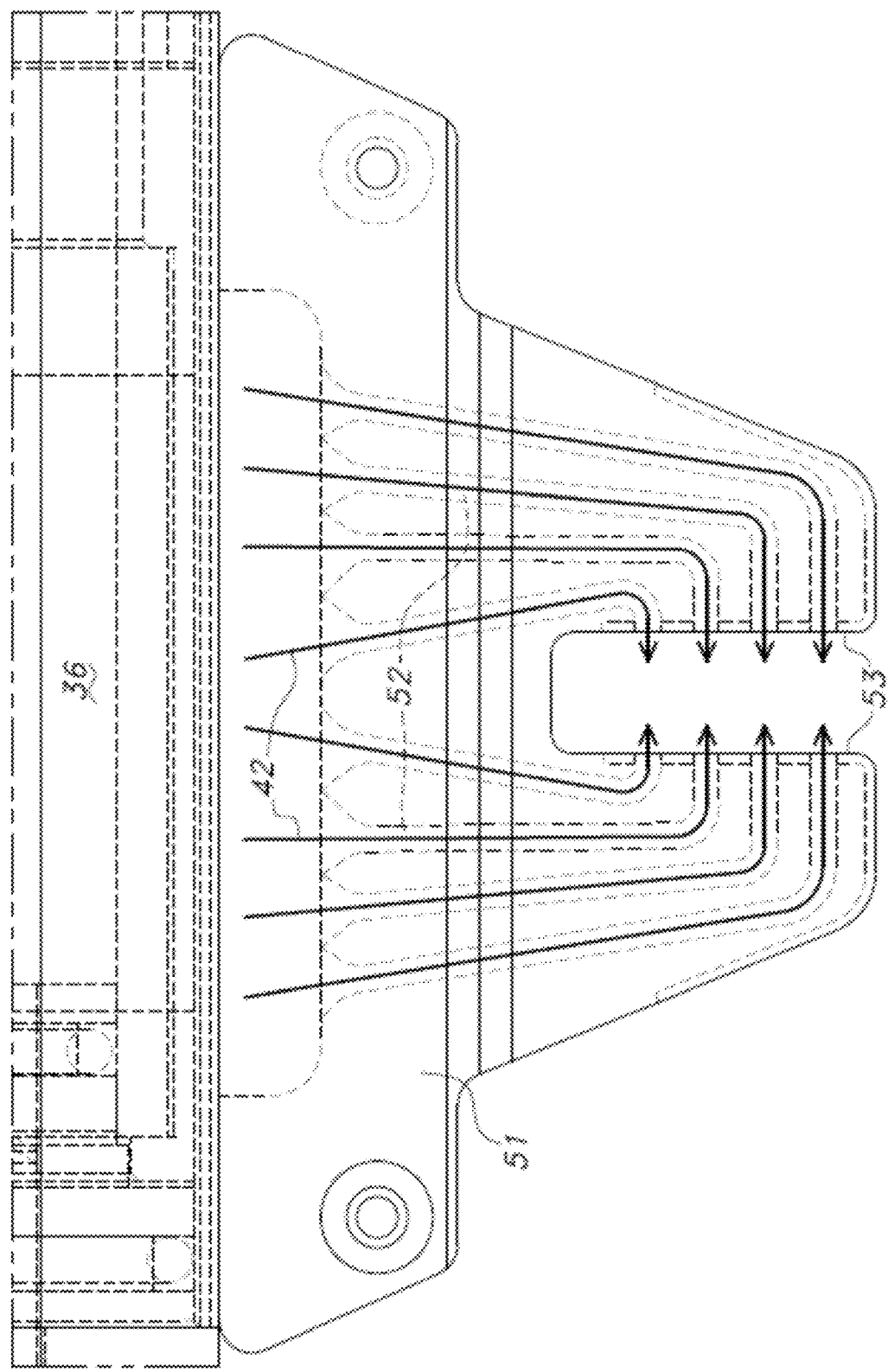
FIG. 16 is an illustration of a handheld plasma tool equipped with a nozzle for splitting the reactive gas into two streams to treat both sides of a plate or flange. This nozzle may be used to clean and activate both sides of a flange prior to bonding or welding it to a tube.

Shown in FIG. 16 is a schematic of the atmospheric pressure plasma device that utilizes a converging nozzle to treat two sides of a material simultaneously. Here, the gaseous species (42) pass from the plasma head (36) and into the nozzle (51) where the gas flow is then split between two different paths (52) which are re-directed to interact which each side of a panel placed in the center region (53).

Many other nozzles may be employed without deviating from the scope of the invention.

Example 5—Handheld Plasma Tool for Depositing Coatings

One embodiment of the invention is an apparatus and method of depositing thin films with the handheld plasma tool. One or more volatile chemical precursors are supplied to the tool such that they combine with at least one reactive species in the afterglow of the plasma. The reactive species from the plasma attack the chemical precursor molecules, causing them to decompose and deposit a thin film on a substrate placed a short distance downstream. This embodiment has many applications, including, but not limited to, coatings to prevent the corrosion of metals, primers to promote adhesion, scratch-resistant films, non-stick films for mold release, and functional coatings to alter the surface energy of a material, e.g. resulting in hydrophilic or hydrophobic behavior. The deposition of the coatings by the handheld plasma tool is an environmentally friendly process.

Figure 17:
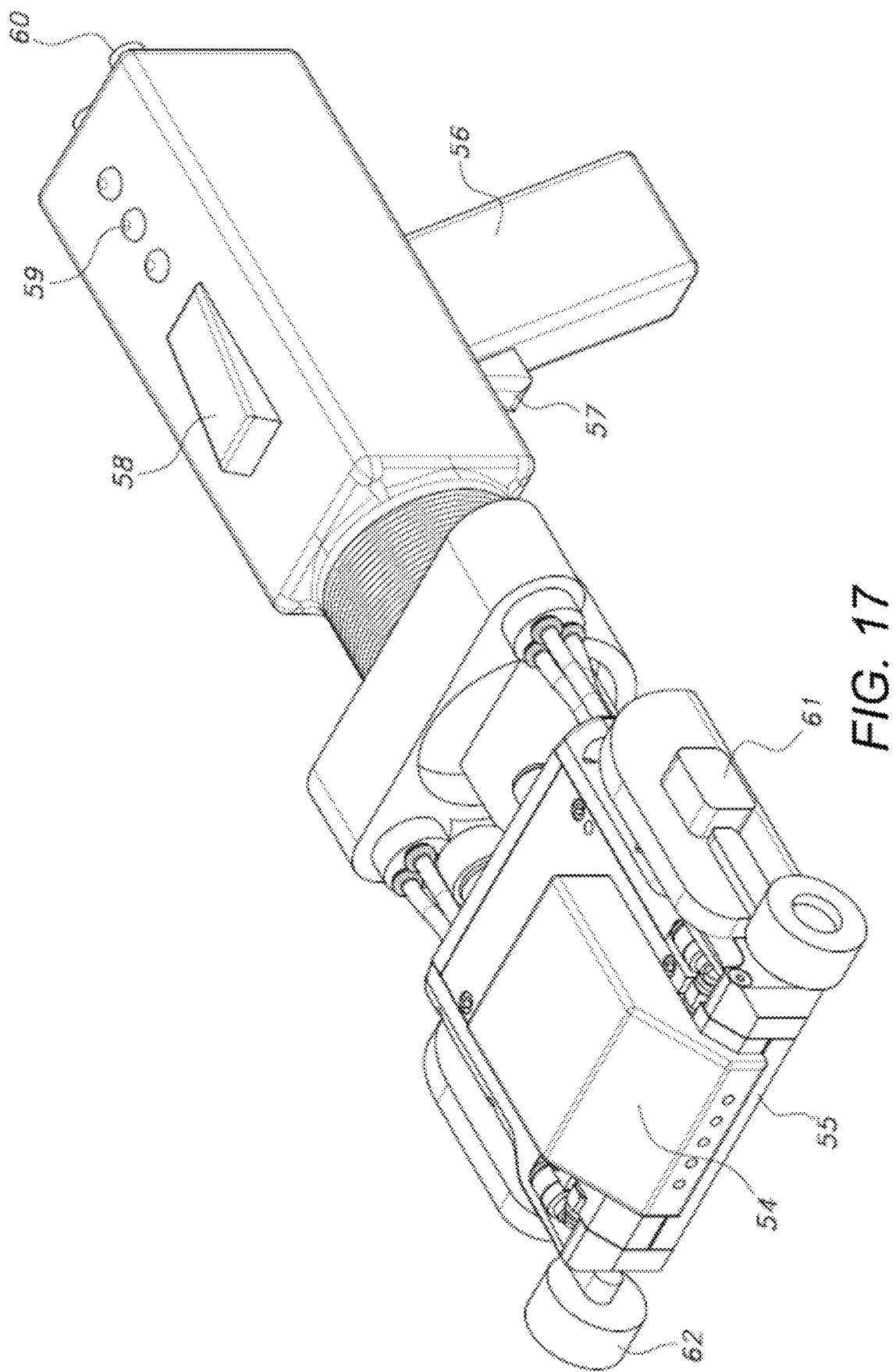
FIG. 17 is a drawing of a handheld plasma tool equipped with a vapor injection nozzle for feeding a chemical precursor into the plasma gas flow, such that a coating is deposited on the surface of a material as the handheld plasma tool is translated back and forth over it.

FIG. 17 shows a handheld plasma tool with a distributor (54) to feed one or more chemical precursors into the gas flow proximate to the outlet of the plasma head (55). The plasma head is attached to a mechanism for handheld operation that includes an ergonomic handle (56), a trigger (57) to start and stop the deposition process, a visual display (58), LED lights (59), connections (60) for gas supply and electrical power, and motor (61) with wheels (62) to control the speed the device scans over the surface.

Figure 18:
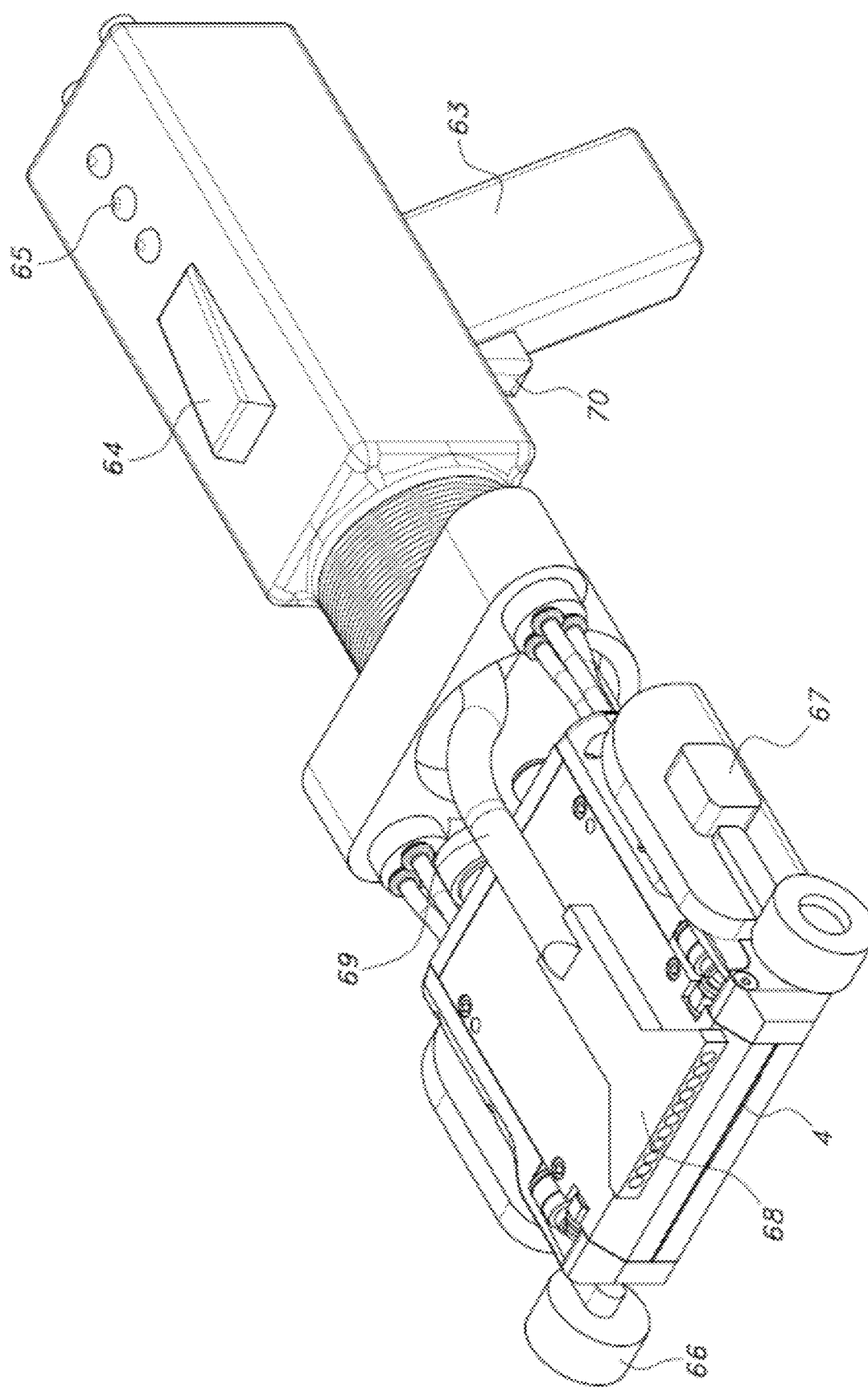
FIG. 18 is an illustration of a handheld plasma tool equipped with an atomizer for injecting a liquid aerosol of chemical precursor into the plasma gas flow, such that a coating is deposited on the surface of a material as the handheld plasma tool is translated back and forth over it.

In another embodiment of the invention, one or more chemical precursors are non-volatile liquids. The liquid is sprayed as an aerosol into the effluent of the plasma where it mixes with at least one reactive species, causing a reaction that leads to the deposition of a coating onto the material surface. An embodiment of the handheld plasma tool for deposition of thin films is shown in FIG. 18. It includes a hand grip (63), a display screen (64), three indicator LEDs (65), an on/off trigger (73), wheels (66), and a motor (67) to drive the wheels at a fixed speed over the substrate. In addition, the tool includes an attachment (68) to uniformly disperse at least one chemical precursor liquid into an atomizer (69). The atomizer (69) sprays an aerosol mist over the substrate. At least on reactive gas species exiting the plasma through slit (4) attacks the liquid chemical precursor, causing a thin film to be deposited on the substrate surface.

Multiple methods can be used to incorporate the liquid chemical precursor into the deposition process. The device may incorporate a distributor at the outlet of the plasma head that is positioned adjacent to the gas exit point as seen in FIG. 18. Alternatively, a two-step plasma curing process is possible where the liquid chemical precursor chemical is sprayed directly onto the surface being treated. The plasma can then pass over the liquid layer thereby curing and converting it into the desired coating. In one embodiment, the liquid layer is very thin, less than 50 nm, to allow the plasma gases to cure the entire layer of material. Coatings of greater thickness are produced by passing the handheld plasma tool back and forth over the surface multiple times.

The embodiment can be used to deposit low surface energy films on glass windows to render the substrates hydrophobic and allow them to repel water. This is particularly useful for windows on aircraft, trains and other commercial products where the periodic re-coating of the glass is required. These applications are only cost effective if they are performed manually by hand, due to the low volume and intermittent nature of the application.

In one embodiment of the invention, a hydrophobic film is generated through the use of fluoroalkylsilane precursors. Plasma activation of glass results in a high concentration of silanol (Si—OH) species on the $SiO_2$ surface. The fluoroalkylsilane precursors are attacked by the reactive species in the plasma effluent, and undergo a chemical reaction that causing them to attach to the silanol groups on the glass surface. As a result, a thin film is deposited on the substrate. Other precursors may be used for this process, including, but not limited to, fluorosilanes, fluoroalkanes, and molecules containing a combination of silicon, carbon, fluorine, hydrogen, oxygen and nitrogen. In addition, polymer films can be deposited by combining organic monomer molecules with the reactive species in the plasma effluent.

In another example, low surface energy, polymer films are deposited for use as a stable and reusable release layer in molding applications. Fluoropolymer coatings are known for their non-stick surface properties and are deposited through the use of monomer molecules containing ligands with carbon and fluorine atoms. These molecules react with the reactive species flowing out of the handheld plasma tool, and polymerize as a coating on the substrate. The fluorocarbon polymer coating will have a composition similar to polytetrafluoroethylene. The substrates that may be coated with the mold release layer include, but are not limited to, fiber-reinforced composites, plastics, metals, glass and ceramics.

Many different materials may be deposited using the low temperature atmospheric pressure plasma, including, organic, inorganic and metallic thin films. The only requirement is that at least one of the elements required in the film can be fed to the device through a volatile or liquid chemical precursor. Thin film materials that may be deposited using this method include, but are not limited to, polymers, metals, ceramics, metal oxides, metal nitrides, metal carbides, and metal phosphides. A wide variety of films may be deposited according to the invention, as will be understood by those skilled in the art.

The foregoing description, including the preferred embodiments of the invention, has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for treating a material surface with an atmospheric pressure plasma, comprising:
    holding a handheld device coupled to an applicator having a gas passage from the handheld device to an outlet such that a reactive gas of the plasma can flow out the outlet and contact the material surface;
    manipulating and controlling the handheld device to apply the reactive gas of the plasma from the outlet to the material surface; and
    maintaining a defined separation between the outlet of the applicator and the material surface with a ventilated spacer affixed to the applicator while manipulating and controlling the handheld device;
    wherein the applicator comprises an indexing tip for inserting into a hole in the material surface such that the plasma is applied to the material surface proximate to the hole.

2. The method of claim 1, wherein the material surface is cleaned and activated for adhesion of a fastener bonded to the material surface.

3. The method of claim 2, wherein the fastener is a nutplate.

4. The method of claim 1, wherein the applicator develops the plasma having the reactive gas from a gas flow directed from the handheld device through the gas passage and into a gap between a powered electrode and a grounded electrode wherein the powered electrode is coupled to radio frequency electrical power.

5. The method of claim 1, wherein the hole in the material surface accepts a rubber fixture which is used to pull a fastener down onto the material surface to make firm contact between the material surface the fastener and the adhesive sandwiched therebetween.

6. The method of claim 1, wherein the outlet for the plasma comprises a showerhead.

7. The method of claim 1, wherein the material is selected from the group consisting of metals, polymers and fiber reinforced composites.

8. A method for treating a material surface with an atmospheric pressure plasma, comprising:
    holding a handheld device coupled to an applicator having a gas passage from the handheld device to an outlet such that a reactive gas of the plasma can flow out the outlet and contact the material surface;
    manipulating and controlling the handheld device to apply the reactive gas of the plasma from the outlet to the material surface; and
    maintaining a defined separation between the outlet of the applicator and the material surface with a ventilated spacer affixed to the applicator while manipulating and controlling the handheld device;
    wherein the ventilated spacer comprises a crenulated lip disposed around a showerhead of the applicator.

9. The method of claim 8, wherein the material surface is cleaned and activated for adhesion of a fastener bonded to the material surface.

10. The method of claim 9, wherein the fastener is a nutplate.

11. The method of claim 8, wherein the applicator develops the plasma having the reactive gas from a gas flow directed from the handheld device through the gas passage and into a gap between a powered electrode and a grounded electrode wherein the powered electrode is coupled to radio frequency electrical power.

12. The method of claim 8, wherein the material is selected from the group consisting of metals, polymers and fiber reinforced composites.

13. The method of claim 8, wherein the crenulated lip against the material surface creates the defined separation between the showerhead and an area surrounding the hole of the material surface for application of the plasma.

14. The method of claim 13, wherein gaps around the crenulated lip allow ventilation of the gas of utilized plasma.

15. A method for treating a material surface with an atmospheric pressure plasma, comprising:
    holding a handheld device coupled to an applicator having a gas passage from the handheld device to an outlet such that a reactive gas of the plasma can flow out the outlet and contact the material surface;
    manipulating and controlling the handheld device to apply the reactive gas of the plasma from the outlet to the material surface; and
    maintaining a defined separation between the outlet of the applicator and the material surface with a ventilated spacer affixed to the applicator while manipulating and controlling the handheld device;
    wherein the outlet comprises a slit for directing the reactive gas onto a strip of the material surface and the ventilated spacer comprises wheels affixed to the applicator to translate the apparatus along the material surface whilst maintaining the defined distance between the outlet and the material surface.

16. The method of claim 15, wherein the material surface is cleaned and activated for adhesion of a fastener bonded to the material surface.

17. The method of claim 16, wherein the fastener is a nutplate.

18. The method of claim 15, wherein the applicator develops the plasma having the reactive gas from a gas flow directed from the handheld device through the gas passage and into a gap between a powered electrode and a grounded electrode wherein the powered electrode is coupled to radio frequency electrical power.

19. The method of claim 15, wherein the material is selected from the group consisting of metals, polymers and fiber reinforced composites.

\* \* \* \* \*